(12) United States Patent
Okamura et al.

(10) Patent No.: US 8,796,960 B2
(45) Date of Patent: Aug. 5, 2014

(54) CONTROL DEVICE FOR MOTOR DRIVE SYSTEM AND VEHICLE INCORPORATING THE SAME

(75) Inventors: Masaki Okamura, Toyota (JP); Naoyoshi Takamatsu, Sunto-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 84 days.

(21) Appl. No.: 13/634,168

(22) PCT Filed: Apr. 21, 2010

(86) PCT No.: PCT/JP2010/057044
§ 371 (c)(1),
(2), (4) Date: Sep. 11, 2012

(87) PCT Pub. No.: WO2011/132269
PCT Pub. Date: Oct. 27, 2011

(65) Prior Publication Data
US 2013/0002174 A1    Jan. 3, 2013

(51) Int. Cl.
*H02P 5/00* (2006.01)
(52) U.S. Cl.
USPC .............. 318/139; 318/400.01; 318/400.15; 318/432
(58) Field of Classification Search
USPC .......... 318/139, 689, 400.01, 400.15, 400.22, 318/400.26, 400.3, 430, 432, 434; 180/65.1, 65.21, 65.285, 65.29, 65.31
See application file for complete search history.

(56) References Cited

U.S. PATENT DOCUMENTS

| 7,701,156 B2 * | 4/2010 | Okamura ................ 318/255 |
| 7,781,999 B2 * | 8/2010 | Amano ................ 318/400.3 |
| 7,852,029 B2 * | 12/2010 | Kato et al. ................ 318/434 |
| 7,898,208 B2 * | 3/2011 | Ochiai et al. ................ 318/760 |
| 8,324,856 B2 * | 12/2012 | Yamakawa et al. ........... 318/812 |
| 2007/0278986 A1 | 12/2007 | Okamura |
| 2009/0230901 A1 | 9/2009 | Amano |
| 2009/0237019 A1 | 9/2009 | Yamakawa et al. |

FOREIGN PATENT DOCUMENTS

| DE | 102007042182 A1 | 3/2009 |
| EP | 2017952 A1 | 1/2009 |
| EP | 2164167 A1 | 3/2010 |
| JP | 7-107772 A | 4/1995 |

(Continued)

OTHER PUBLICATIONS

International Search Report for PCT/JP2010/057044 dated Aug. 3, 2010.

*Primary Examiner* — Bentsu Ro
*Assistant Examiner* — Thai Dinh
(74) *Attorney, Agent, or Firm* — Sughrue Mion, PLLC

(57) ABSTRACT

A control device for a motor drive system including an AC motor having a magnet in a rotor, a converter, and an inverter generates a step-up command value for the converter based on a torque command value for the AC motor. The control device determines whether or not to carry out field-weakening control for increasing a current in a direction weakening force of a magnet that is supplied from the inverter to the AC motor, based on the step-up command value and a state of drive of the AC motor. When field-weakening control should be carried out and when an absolute value of the torque command value is smaller than a threshold value, the control device further increases the generated step-up command value. By doing so, an amount of a field-weakening current can be decreased and therefore efficiency of the motor drive system can be improved.

12 Claims, 25 Drawing Sheets

(56) References Cited

FOREIGN PATENT DOCUMENTS

| | | |
|---|---|---|
| JP | 10-66383 A | 3/1998 |
| JP | 2005-210772 A | 8/2005 |
| JP | 2007-202311 A | 8/2007 |
| JP | 2008-259270 A | 10/2008 |
| JP | 2009-65758 A | 3/2009 |
| JP | 2009-225633 A | 10/2009 |

* cited by examiner

FIG.2

| CONTROL SCHEME | SINE WAVE PWM | OVERMODULATION PWM | RECTANGULAR WAVE (1 PULSE) |
|---|---|---|---|
| | PWM CONTROL MODE | | RECTANGULAR WAVE CONTROL MODE |
| WAVEFORM OF OUTPUT VOLTAGE FROM INVERTER | FUNDAMENTAL WAVE COMPONENT | FUNDAMENTAL WAVE COMPONENT | FUNDAMENTAL WAVE COMPONENT |
| MODULATION FACTOR | 0 – APPROXIMATELY 0.61 | HIGHEST VALUE IN SINE WAVE PWM – 0.78 | 0.78 |
| CHARACTERISTIC | SMALL TORQUE FLUCTUATION | IMPROVEMENT IN OUTPUT IN INTERMEDIATE-SPEED REGION | IMPROVEMENT IN OUTPUT IN HIGH-SPEED REGION |

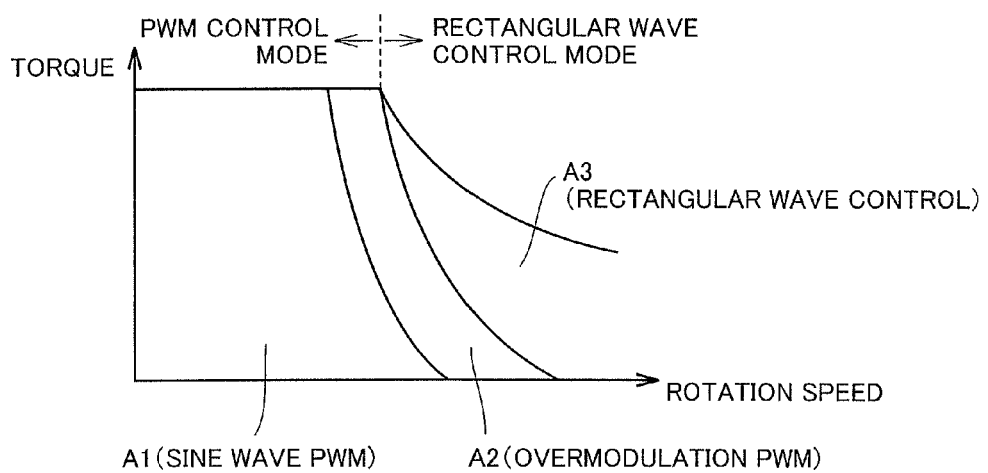

FIG.3

CONTROL DEVICE FOR MOTOR DRIVE SYSTEM AND VEHICLE INCORPORATING THE SAME

CROSS REFERENCE TO RELATED APPLICATIONS

This application is a National Stage of International Application No. PCT/JP2010/057044 filed Apr. 21, 2010, the contents of which are incorporated herein by reference in their entirety.

TECHNICAL FIELD

The present invention relates to a control device for a motor drive system and a vehicle incorporating the same, and more particularly to motor drive control for reducing loss in a motor drive system capable of field-weakening control.

BACKGROUND ART

Recently, a vehicle incorporating a power storage device (such as a secondary battery or a capacitor) and running with driving force generated from electric power stored in the power storage device has attracted attention as an environmentally friendly vehicle. Such a vehicle includes, for example, an electric car, a hybrid car, a fuel cell car, and the like.

In these vehicles, in order to generate driving force from electric power stored in the power storage device, a motor is generally provided. A permanent magnet synchronous motor (PM motor) in which a permanent magnet is embedded in a rotor may be adopted as this motor. In such a PM motor, in order to minimize a current for driving the motor, magnetic force generated from a magnet may be set to be relatively strong. In such a case, however, during rotation of the motor at a high speed, an induced voltage (counterelectromotive force) in the motor generated by the magnet may become higher than an input voltage for an inverter driving the motor.

In order to address such a problem, what is called field-weakening control in which an induced voltage in a motor is lowered by increasing a field current in such a direction as weakening magnetic force of the magnet has generally been known. By using this field-weakening control, the motor can be driven continuously up to high rotation without uncontrollability.

Japanese Patent Laying-Open No. 2008-259270 (PTL 1) discloses a technique with which, in an electrically powered vehicle, in a case where a target value for an inverter input voltage is varied in such a situation as a low atmospheric pressure, from a point of view of protection of components, a threshold value for switching between cut-off of a gate of the inverter and zero torque control (field-weakening control) is varied in coordination with a voltage target value. According to Japanese Patent Laying-Open No. 2008-259270 (PTL 1), counterelectromotive force generated in a motor flows as regenerative electric power so that unintended regenerative braking can be prevented from occurring.

CITATION LIST

Patent Literature

PTL 1: Japanese Patent Laying-Open No. 2008-259270
PTL 2: Japanese Patent Laying-Open No. 2009-065758
PTL 3: Japanese Patent Laying-Open No. 10-066383
PTL 4: Japanese Patent Laying-Open No. 07-107772

SUMMARY OF INVENTION

Technical Problem

By carrying out such field-weakening control, a motor can be driven up to high rotation without uncontrollability. On the other hand, since it is necessary to increase a motor current for field-weakening control, to the contrary, loss due to increase in current increases. For this reason, failure in improvement in fuel efficiency (efficiency) in a high-speed region may be caused.

The present invention was made to solve such problems, and an object thereof is to improve efficiency by reducing an amount of a field-weakening current in a motor drive system in which field-weakening control is carried out in a high-speed region.

Solution to Problem

A control device according to the present invention is a control device for a motor drive system for driving an AC motor having a magnet in a rotor. The motor drive system includes a DC power supply configured to be chargeable, a first converter for stepping up a power supply voltage supplied from the DC power supply, and an inverter for driving the AC motor by converting DC power from the first converter to AC power. The control device generates a step-up command value for the first converter based on a torque command value for the AC motor. In addition, the control device determines whether or not to carry out field-weakening control for increasing a current in a direction weakening force of the magnet that is supplied from the inverter to the AC motor based on the step-up command value and a state of drive of the AC motor. Then, the control device further increases the generated step-up command value when field-weakening control should be carried out and when an absolute value of the torque command value is smaller than a threshold value.

Preferably, when field-weakening control should be carried out and when the absolute value of the torque command value is smaller than the threshold value, the control device further increases the generated step-up command value based on a first voltage fluctuation component restricting the step-up command value, in consideration of output voltage fluctuation in the first converter caused by control.

Preferably, when field-weakening control should be carried out and when the absolute value of the torque command value is smaller than the threshold value, the control device further increases the generated step-up command value based on a second voltage fluctuation component restricting the step-up command value, in consideration of a smaller one of voltage fluctuation at the time of a switching operation of a switching element included in the first converter and voltage fluctuation at the time of a switching operation of a switching element included in the inverter.

Preferably, the second voltage fluctuation component is determined, with regard to the first converter, in accordance with a current that flows in the first converter, and is determined, with regard to the inverter, in accordance with a current that flows in the AC motor.

Preferably, the current that flows in the first converter is calculated based on the current that flows in the AC motor.

Preferably, when field-weakening control should be carried out and when the torque command value is substantially zero, the control device stops a switching operation of the first converter and the inverter and further increases the generated step-up command value up to a withstand voltage of a switching element included in the first converter and the inverter.

Preferably, the withstand voltage of the switching element included in the first converter is higher than the withstand voltage of the switching element included in the inverter.

Preferably, the motor drive system further includes a capacitor for absorbing electric power generated at a power supply node between the first converter and the inverter and a second converter connected between the power supply node and the capacitor. The control device restricts the step-up command value to a voltage obtained by subtracting a voltage corresponding to at least one of the first voltage fluctuation component and the second voltage fluctuation component from the withstand voltage of the switching element included in the first converter and controls the second converter such that a voltage at the power supply node is lower than the restricted step-up command value, when a state that the inverter and the first converter have been stopped is to be canceled.

A vehicle according to the present invention includes an AC motor having a magnet in a rotor, a DC power supply configured to be chargeable, a drive device for driving the AC motor with electric power from the DC power supply, and a control device for controlling the drive device. The drive device includes an inverter for driving the AC motor and a converter connected between the DC power supply and the inverter and configured to convert a voltage between the DC power supply and the inverter. The control device generates a step-up command value for the converter based on a torque command value for the AC motor. In addition, the control device determines whether or not to carry out field-weakening control for increasing a current in a direction weakening force of the magnet that is supplied from the inverter to the AC motor based on the step-up command value and a state of drive of the AC motor. Then, the control device further increases the generated step-up command value when field-weakening control should be carried out and when an absolute value of the torque command value is smaller than a threshold value.

Preferably, the AC motor includes a first AC motor mainly for generating electric power for charging the DC power supply and a second AC motor mainly for generating driving force for running the vehicle. The inverter includes a first inverter for driving the first AC motor and a second inverter connected to the converter in parallel to the first inverter, for driving the second AC motor. In addition, the vehicle further includes an engine and a locking mechanism. The engine is connected to the first AC motor and the second AC motor and it generates driving force for the vehicle under the control by the control device in coordination with the first AC motor and the second AC motor. The locking mechanism is configured to be able to mechanically fix rotation of the first AC motor when a predetermined condition is satisfied. Then, the control device further increases the generated step-up command value based on a state of drive of the second AC motor when the locking mechanism fixes rotation of the first AC motor.

Preferably, when the locking mechanism fixes rotation of the first AC motor, the control device drives the vehicle with driving force generated by the engine and stops a switching operation of the first inverter, the second inverter, and the converter.

Preferably, the control device has a free running mode in which driving force provided to the vehicle is set substantially to zero, and when the free running mode is set, the control device stops a switching operation of the inverter and the converter.

Advantageous Effects of Invention

According to the present invention, efficiency can be improved by reducing an amount of a field-weakening current in a motor drive system in which field-weakening control is carried out in a high-speed region.

BRIEF DESCRIPTION OF DRAWINGS

FIG. 2 is a diagram schematically illustrating a control mode of the AC motor in the motor drive system according to the present embodiment.

FIG. 3 is a diagram showing correspondence between an operating state and a control mode of the AC motor.

DESCRIPTION OF EMBODIMENTS

Figure 1:
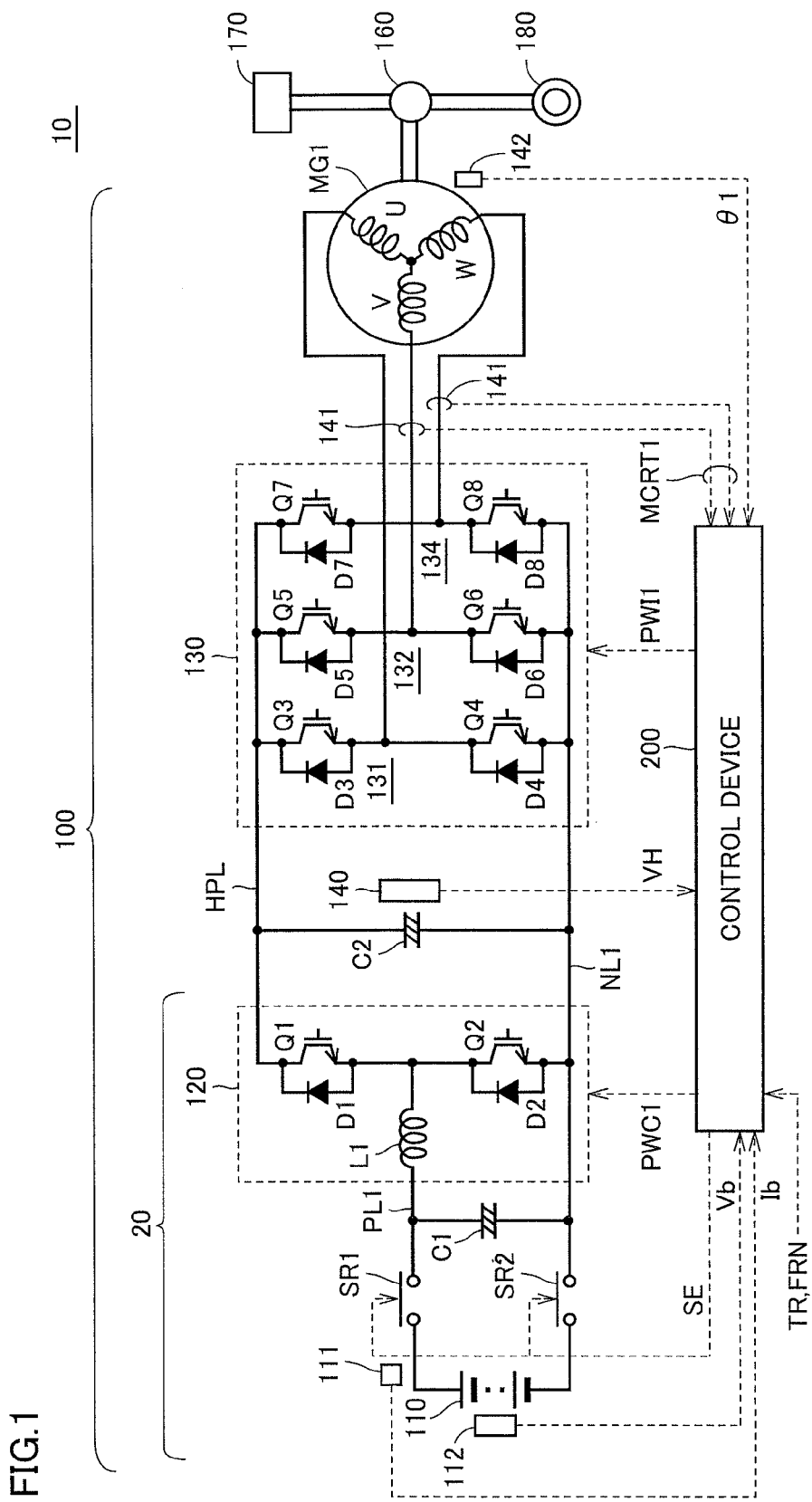
FIG. 1 is an overall configuration diagram of a vehicle incorporating a motor drive system to which a control device for an AC motor according to the present embodiment is applied.

An embodiment of the present invention will be described hereinafter in detail with reference to the drawings. In the drawings, the same or corresponding elements have the same reference characters allotted and description thereof will not be repeated.

[Overall Configuration of Motor Control]

FIG. 1 is an overall configuration diagram of a vehicle 10 incorporating a motor drive system 100 to which a control device for an AC motor according to the present embodiment is applied.

Referring to FIG. 1, vehicle 10 includes motor drive system 100, a motive power transmission gear 160, an engine 170, and a drive wheel 180. In addition, motor drive system 100 includes a DC voltage generation portion 20, a capacitor C2, an inverter 130, an AC motor MG1, and a control device 200.

Though a hybrid vehicle including AC motor MG1 and engine 170 as in FIG. 1 will be described in the present embodiment by way of example of vehicle 10, vehicle 10 is not restricted to this configuration so long as it is a vehicle generating driving force with a motor by using electric energy. Namely, vehicle 10 includes an electric car, a fuel cell car, and the like, in addition to a hybrid car.

AC motor MG1 is a motor for driving, for generating torque for driving drive wheel 180 in vehicle 10. Alternatively, this AC motor MG1 may be configured to have a function as a power generator driven by engine 170 or configured to have functions of both of a motor and a power generator. Further, AC motor MG1 may operate as a motor for engine 170, and for example, it may be incorporated in a hybrid car as a component capable of starting an engine. Namely, in the present embodiment, an "AC motor" includes an AC-driven motor, a power generator, and a motor generator.

Output torque of AC motor MG1 is transmitted to drive wheel 180 through motive power transmission gear 160 constituted of a reduction gear and a power split device, to thereby run vehicle 10. During a regenerative braking operation of vehicle 10, AC motor MG1 can generate electric power with rotational force of drive wheel 180. Then, generated electric power is converted by inverter 130 to electric power for charging a DC power supply 110.

In addition, AC motor MG1 is connected to engine 170 with motive power transmission gear 160 being interposed. Then, as control device 200 operates engine 170 and AC motor MG1 in coordination, required vehicle driving force is generated. In this case, DC power supply 110 can also be charged with electric power generated by rotation of the engine. Though FIG. 1 shows a configuration including one AC motor and one inverter, a configuration can also include a plurality of pairs of an AC motor and an inverter.

DC voltage generation portion 20 includes DC power supply 110, system relays SR1, SR2, a capacitor C1, and a converter 120.

DC power supply 110 is representatively configured to include a power storage device having such a secondary battery as a nickel metal hydride battery or a lithium ion battery, an electric double layer capacitor, or the like. A DC voltage Vb output from DC power supply 110 and a DC current Ib input to and output from DC power supply 110 are detected by a voltage sensor 112 and a current sensor 111, respectively. These detection values are transmitted to control device 200.

System relay SR1 is connected between a positive electrode terminal of DC power supply 110 and a power line PL1. System relay SR2 is connected between a negative electrode terminal of DC power supply 110 and a ground line NL1. System relays SR1, SR2 are controlled to turn on and off by a signal SE from control device 200, and to switch between supply and cut-off of electric power between DC power supply 110 and converter 120.

Converter 120 includes a reactor L1, switching elements Q1, Q2, and diodes D1, D2. Switching elements Q1 and Q2 are connected in series between a power line HPL and ground line NL1. Switching elements Q1 and Q2 are controlled to turn on and off by a switching control signal PWC1 from control device 200.

In the present embodiment, an IGBT (Insulated Gate Bipolar Transistor), a power MOS (Metal Oxide Semiconductor) transistor, a power bipolar transistor, or the like can be employed as a switching element. Anti-parallel diodes D1, D2 are arranged for switching elements Q1, Q2. Reactor L1 is connected between a connection node of switching elements Q1 and Q2 and power line PL1. Capacitor C2 is connected between power line HPL and ground line NL1.

Inverter 130 is configured to include a U-phase upper and lower min 131, a V-phase upper and lower arm 132, and a W-phase upper and lower arm 133 that are provided in parallel between power line HPL and ground line NL1. The upper and lower arm of each phase is constituted of switching elements connected in series between power line HPL and ground line NL1. For example, U-phase upper and lower arm 131 includes switching elements Q3, Q4, V-phase upper and lower arm 132 includes switching elements Q5, Q6, and W-phase upper and lower arm 133 includes switching elements Q7, Q8. In addition, anti-parallel diodes D3 to D8 are connected to switching elements Q3 to Q8, respectively. Switching elements Q3 to Q8 are controlled to turn on and off by a switching control signal PWI1 from control device 200.

Representatively, AC motor MG1 is a three-phase permanent magnet synchronous motor and it is configured such that one ends of three coils of respective U-, V-, and W-phases are commonly connected to a neutral point. Further, the other end of the coil of each phase is connected to a point intermediate between the switching elements in upper and lower arm 131 to 132 of each phase.

Converter 120 is basically controlled such that switching elements Q1 and Q2 are turned on and off alternately in a complementary manner in each switching cycle. During a step-up operation, converter 120 steps up DC voltage Vb supplied from DC power supply 110 to a DC voltage VH (this DC voltage corresponding to an input voltage to inverter 130 being also hereinafter referred to as a "system voltage"). This step-up operation is performed by supplying electromagnetic energy stored in reactor L1 during an ON period of switching element Q2, through switching element Q1 and anti-parallel diode D1 to power line HPL.

On the other hand, during a step-down operation, converter 120 lowers DC voltage VH to DC voltage Vb. This step-down operation is performed by supplying electromagnetic energy stored in reactor L1 during an ON period of switching element Q1, through switching element Q2 and anti-parallel diode D2 to ground line NL1. A voltage conversion ratio in these step-up operation and step-down operation (a ratio between VH and Vb) is controlled by a ratio between the ON periods of switching elements Q1, Q2 in the switching cycle above (a duty ratio). It is noted that, by fixing switching elements Q1 and Q2 to ON and OFF respectively, relation of VH=Vb (a voltage conversion ratio=1.0) can also be satisfied.

Capacitor C2 smoothes a DC voltage from converter 120 and supplies the smoothed DC voltage to inverter 130. A voltage sensor 140 detects a voltage across capacitor C2, that is, system voltage VH, and outputs the detection value to control device 200.

In a case where a torque command value for AC motor MG1 is positive (TR>0), when a DC voltage is supplied from capacitor C2, inverter 130 drives AC motor MG1 by converting the DC voltage to an AC voltage to thereby output positive torque, based on a switching operation of switching elements Q3 to Q8 in response to switching control signal PWI1 from control device 200. Alternatively, in a case where a torque command value for AC motor MG1 is zero (TR=0), inverter 130 drives AC motor MG1 by converting a DC voltage to an AC voltage to thereby attain torque of zero, based on a switching operation in response to switching control signal PWI1. Thus, AC motor MG1 is driven to generate zero or positive torque designated by a torque command value TR.

Further, during regenerative braking of the vehicle incorporating motor drive system 100, torque command value TR for AC motor MG1 is set to be negative (TR<0). In this case, inverter 130 converts an AC voltage generated by AC motor MG1 to a DC voltage and supplies the resultant DC voltage (system voltage) to converter 120 through capacitor C2, based on a switching operation in response to switching control signal PWI1. It is noted that regenerative braking herein includes braking accompanying regeneration when a driver driving a vehicle operates a foot brake, and deceleration (or stop of acceleration) of a vehicle while carrying out regeneration, in which an accelerator pedal is off during running although a foot brake is not operated.

A current sensor 141 detects a motor current MCRT1 that flows in AC motor MG1 and outputs the detected motor current to control device 200. It is noted that, since the sum of instantaneous values of three-phase currents of the U-phase, the V-phase, and the W-phase is zero, it suffices that current sensor 141 is arranged to detect motor currents of two phases (for example, a V-phase current and a W-phase current) as shown in FIG. 1.

A rotation angle sensor (resolver) 142 detects an angle of rotation $\theta 1$ of AC motor MG1 and outputs detected angle of rotation $\theta 1$ to control device 200. Control device 200 can calculate a rotation speed MRN1 and an angular velocity col (rad/s) of AC motor MG1 based on angle of rotation $\theta 1$. It is noted that it is not necessary to arrange rotation angle sensor 142 if angle of rotation $\theta 1$ is directly calculated from a motor voltage or a current in control device 200.

Control device 200 is configured with an electronic control unit and it controls an operation of motor drive system 100 through software processing in which a not-shown CPU executes a program stored in advance and/or through hardware processing using dedicated electronic circuitry.

As a representative function, control device 200 controls an operation of converter 120 and inverter 130 such that AC motor MG1 outputs torque in accordance with torque command value TR, based on input torque command value TR, DC voltage Vb detected by voltage sensor 112, DC current Ib detected by current sensor 111, system voltage VH detected by voltage sensor 140 and motor current MCRT1 from current sensor 141, angle of rotation $\theta 1$ from rotation angle sensor 142, and the like. Namely, control device 200 generates switching control signals PWC1, PW11 for controlling converter 120 and inverter 130 as above and outputs the respective signals to converter 120 and inverter 130.

During a step-up operation of converter 120, control device 200 provides feedback control of system voltage VH and generates switching control signal PWC1 such that system voltage VH is equal to the step-up command value.

On the other hand, in a regenerative braking mode of the vehicle, control device 200 generates switching control signal PWI1 for converting an AC voltage generated in AC motor MG1 to a DC voltage and outputs the signal to inverter 130. Thus, inverter 130 converts an AC voltage generated in AC motor MG1 to a DC voltage and supplies the resultant DC voltage to converter 120.

Further, during the regenerative braking mode of the vehicle, control device 200 generates switching control signal PWC1 for lowering a DC voltage supplied from inverter 130 and outputs the signal to converter 120. Thus, an AC voltage generated by AC motor MG1 is converted to a DC voltage, which is further lowered, and the resultant voltage is supplied to DC power supply 110.

[Description of Control Mode]

Control of AC motor MG1 by control device 200 will be described in further detail.

FIG. 2 is a diagram schematically illustrating a control mode of AC motor MG1 in the motor drive system according to the present embodiment.

As shown in FIG. 2, in motor drive system 100 according to the present embodiment, for controlling AC motor MG1, that is, power conversion in inverter 130, switching among three control modes of sine wave PWM control, overmodulation PWM control, and rectangular wave control is made for use.

Sine wave PWM control is used as general PWM control, in which ON and OFF of an element in the upper and lower arm of each phase is controlled based on voltage comparison between a sinusoidal voltage command and a carrier wave (representatively, a triangular wave). Consequently, regarding a set of a high-level period corresponding to an ON period of an element in the upper arm and a low-level period corresponding to an ON period of an element in the lower arm, duty is controlled such that a fundamental wave component thereof exhibits a sine wave within a certain period. As is well known, in sine wave PWM control in which amplitude of a sinusoidal voltage command is restricted within a range not higher than amplitude of a carrier wave, a fundamental wave component of a voltage applied to AC motor MG1 (hereinafter also simply referred to as a "motor application voltage") can be increased only up to approximately 0.61 times of a DC link voltage of an inverter. Hereinafter, a ratio of a fundamental wave component (an effective value) of a motor application voltage (a line voltage) to a DC link voltage (that is, system voltage VH) of inverter 130 will herein be referred to as a "modulation factor".

In sine wave PWM control, since amplitude of a sinusoidal voltage command is within a range not higher than amplitude of a carrier wave, a line voltage applied to AC motor MG1 is sinusoidal.

On the other hand, in rectangular wave control, one pulse of a rectangular wave of which ratio between a high-level period and a low-level period in the certain period above is 1:1 is applied to the AC motor. Thus, the modulation factor is increased to 0.78.

Overmodulation PWM control refers to control for carrying out PWM control the same as sine wave PWM control above within a range where amplitude of a voltage command (a sine wave component) is greater than amplitude of a carrier wave. In particular, by distorting a voltage command from an original waveform of a sine wave (amplitude correction), a fundamental wave component can be raised and the modulation factor can be increased from a highest modulation factor in a sine wave PWM control mode to a range of 0.78. In overmodulation PWM control, since amplitude of a voltage command (a sine wave component) is greater than amplitude of a carrier wave, a line voltage applied to AC motor MG1 is a distorted voltage, rather than a sine wave.

In AC motor MG1, as a rotation speed or output torque increases, an induced voltage becomes higher and therefore a drive voltage required (a motor required voltage) becomes higher. A voltage boosted by converter 120, that is, system voltage VH, should be set higher than this motor required voltage. On the other hand, there is a limit value (a VH maximum voltage) for a voltage boosted by converter 120, that is, system voltage VH.

Therefore, in accordance with a state of operation of AC motor MG1, any of the PWM control mode based on sine wave PWM control or overmodulation PWM control in which amplitude and a phase of a motor application voltage (AC) are controlled based on feedback of a motor current, and the rectangular wave control mode is selectively applied.

In rectangular wave control, since amplitude of a motor application voltage is fixed, a controllable parameter is only a phase of a motor application voltage. In rectangular wave control, based on difference between a target torque command value and a torque actual value, there are a case where torque feedback control for directly controlling a phase of a rectangular wave voltage pulse is carried out and a case where a phase of a motor application voltage is controlled based on feedback of a motor current as in PWM control. It is noted that, in rectangular wave control, by controlling a phase of a motor application voltage, a current having such a field component as weakening magnetic force of a permanent magnet in a rotor is consequently controlled. Namely, a region of rectangular wave control corresponds to a field-weakening control region which will be described later.

FIG. 3 shows correspondence between an operating state and a control mode described above of AC motor MG1.

Referring to FIG. 3, briefly, sine wave PWM control is employed for decreasing torque fluctuation in a low-rotation region A1, overmodulation PWM control is applied in an intermediate-rotation region A2, and rectangular wave control is applied in a high-rotation region A3. In particular, by applying overmodulation PWM control and rectangular wave control, output from AC motor MG1 is improved. Thus, which of the control modes shown in FIG. 2 is to be employed is basically determined within a range of a realizable modulation factor.

[Embodiment 1]

In such a motor drive system, in order to achieve high rotation or high output of AC motor MG1 as described above, system voltage VH should be increased. This system voltage VH, however, cannot be set to unlimitedly be higher, and it may be restricted basically by a withstand voltage of such equipment as a converter or an inverter.

Figure 4:
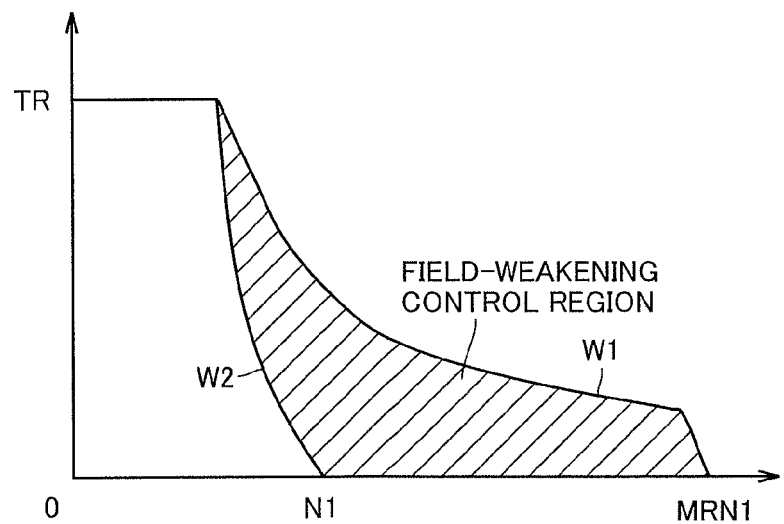
FIG. 4 is a diagram showing relation between a rotation speed of the AC motor and a torque command value.

FIG. 4 is a diagram showing relation between rotation speed MRN1 of AC motor MG1 and torque command value TR as in FIG. 3. In FIG. 4, a line W2 shows a limit value at which system voltage VH attains to a maximum value.

Namely, a low-rotation side or a low-output side relative to line W2 is a region where system voltage VH is variable, and in this region, a desired rotation speed and output torque can be obtained by controlling magnitude of a motor application voltage based on PWM control described above (sine wave PWM control and overmodulation PWM control). On a high-rotation side or a high-output side relative to line W2, however, system voltage VH has already reached the maximum value and therefore magnitude of system voltage VH cannot be controlled. Therefore, in this region, a phase of a rectangular wave voltage pulse applied to the motor is controlled as described above. In other words, field-weakening control is carried out, in which control is carried out in a case where a current supplied to the motor is converted to vectors of two phases of a d axis and a q axis such that a d-axis current corresponding to what is called a field current component is increased to weaken strength of a magnet. By doing so, while system voltage VH is fixed at the maximum value, an operation can be continued to a high rotation speed. Though FIG. 4 shows only a case where torque command value TR is positive, that is, a case of power running, the same also applies to a case of regeneration where torque command value TR is negative.

Figure 5:
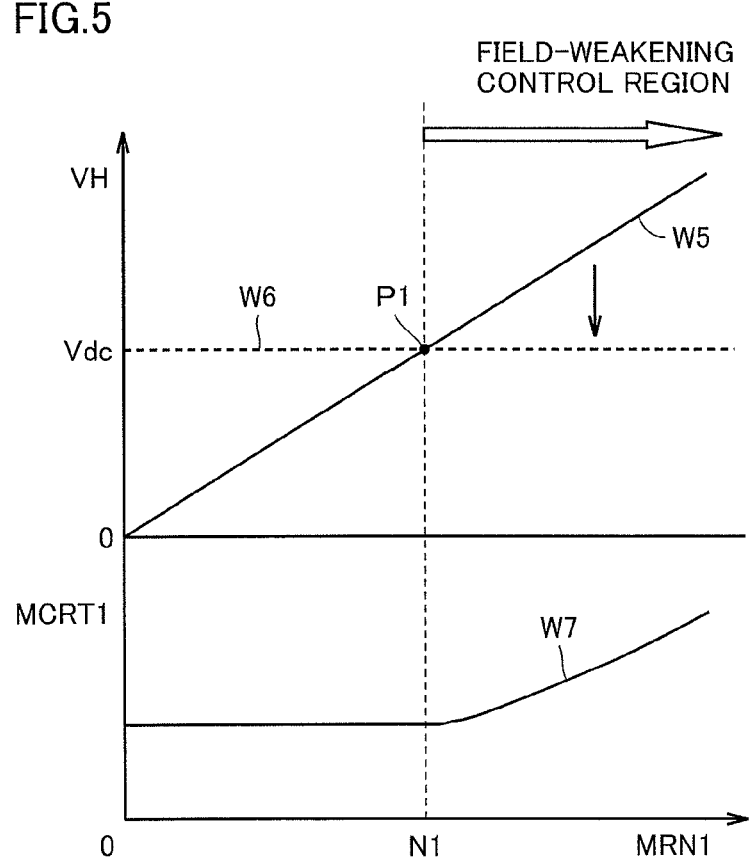
FIG. 5 is a diagram showing relation between a rotation speed of the AC motor and an induced voltage and a motor current generated in the AC motor.

FIG. 5 is a diagram showing one example of relation between rotation speed MRN1 of AC motor MG1, and an induced voltage (counterelectromotive force) and a motor current MCRT1 generated in AC motor MG1.

As shown with a line W5 in FIG. 5, an induced voltage generated in AC motor MG1 increases in proportion to rotation speed MRN1 when the field is constant. Then, with a maximum value of system voltage VH determined by such electric equipment as a converter or an inverter being denoted as Vdc, when a rotation speed is higher than a rotation speed N1 which corresponds to a point P1 where this maximum value Vdc is in balance with the induced voltage of AC motor MG1, the induced voltage becomes higher than maximum system voltage Vdc. Then, a voltage exceeding a withstand voltage of electric equipment is applied, which may cause breakage, deterioration, or the like of the equipment.

Therefore, as shown with a line W7 in FIG. 5, by increasing a current weakening strength of a magnet (a field current) in motor current MCRT1, an induced voltage generated in AC motor MG1 is controlled to lower, so as not to exceed maximum system voltage Vdc.

By carrying out such field-weakening control, AC motor MG1 can be operated up to a high rotation speed while an induced voltage is not allowed to exceed maximum system voltage Vdc, whereas a current supplied to AC motor MG1 increases as shown with W7 in FIG. 5. Therefore, loss due to this increased current increases, and in some cases, efficiency cannot be improved in particular in a high-speed operation region.

Even in a region where field-weakening control is applied, for example, with regard to vehicle 10 shown in FIG. 1, in a case of an operation state where a torque command value is small such as during coasting with an accelerator pedal being unoperated during running at high speed on a highway, a q-axis current representing a torque component of a motor current decreases and correspondingly voltage fluctuation resulting from control may also become less. Therefore, maximum system voltage Vdc determined in consideration of this voltage fluctuation can be relaxed in some cases.

Then, in present Embodiment 1, in the motor drive system where field-weakening control is carried out, in a case where a torque command value is small, such motor drive control as enabling PWM control to continue toward a high-speed side is carried out by shifting a region where field-weakening control is carried out toward a side of a speed as high as possible. Thus, a current for field-weakening control can be decreased in the high rotation speed region and efficiency of the motor drive system can be improved.

Outlines of motor drive control in present Embodiment 1 will be described with reference to FIGS. 6 to 9.

Figure 6:
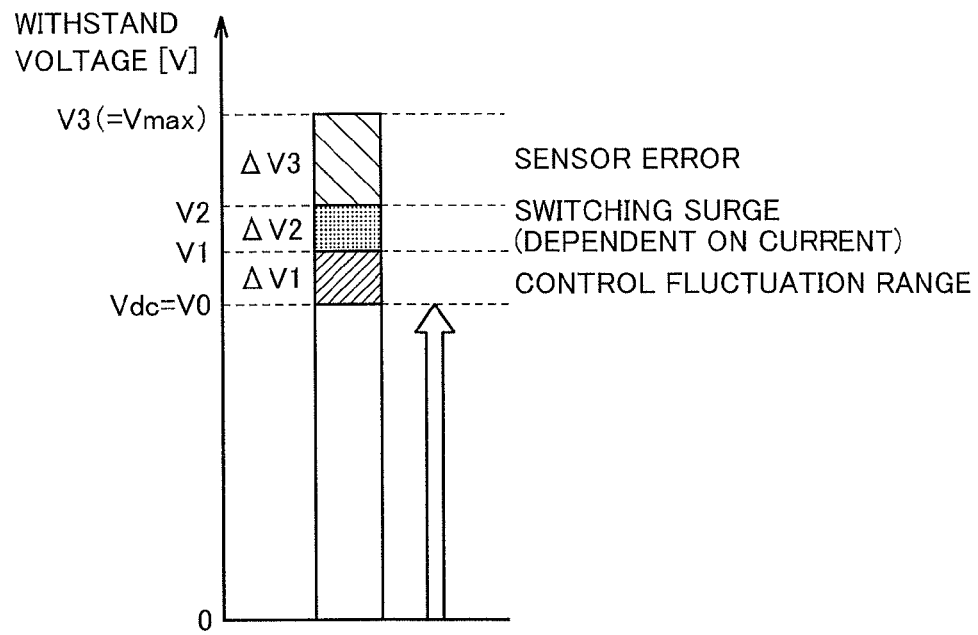
FIG. 6 is a diagram for illustrating a schematic method for determining a maximum value of a system voltage at the time of design of a converter and an inverter.

FIG. 6 is a diagram for illustrating a schematic method for determining maximum value Vdc of system voltage VH at the time of design of converter 120 and inverter 130.

Referring to FIG. 6, generally, maximum value Vdc of system voltage VH is determined by a static withstand voltage of a switching element included in such electric equipment. Namely, in a case where a withstand voltage Vmax of a single switching element is set to V3 in FIG. 6, a voltage V0 obtained by subtracting a voltage fluctuation component ΔV1 that can be generated due to normal control fluctuation, a voltage fluctuation component ΔV2 generated due to a surge current produced when a switching element performs a switching operation, and a voltage fluctuation component ΔV3 generated due to a detection error in a current sensor or a voltage sensor from withstand voltage Vmax of the single switching element is determined as maximum value Vdc of system voltage VH.

As described above, in a case where a torque command value is very small, a voltage fluctuation component that can be generated due to control fluctuation is small and hence there is a case where ΔV1 described with reference to FIG. 6 does not have to be taken into account. Therefore, in present Embodiment 1, in a case where a torque command value is smaller than a prescribed reference value in a region where field-weakening control would normally be carried out, the maximum value of system voltage VH is relaxed to Vdc1 (=V1) as shown in FIG. 7 to increase a step-up command value, and whether or not to carry out field-weakening control is determined.

Figure 8:
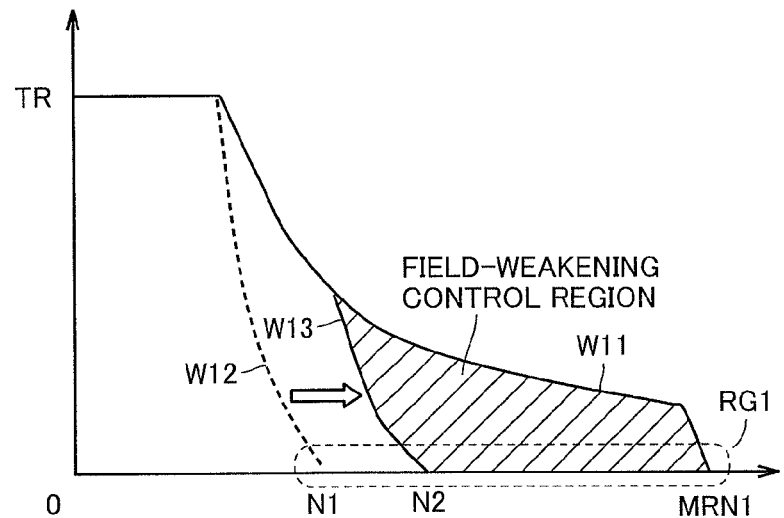
FIG. 8 is a diagram showing relation between a rotation speed of an AC motor and a torque command value in Embodiment 1.

FIG. 8 is a diagram showing relation between rotation speed MRN1 of AC motor MG1 and torque command value TR as in FIG. 4, in a case of Embodiment 1. In FIG. 8, a region of interest in present Embodiment 1 is a region where a rotation speed is high and a torque command is low as shown with a region RG1 surrounded with a dashed line. In the present embodiment, when this region RG1 is applicable, the step-up command value is increased by relaxing the maximum value of system voltage VH. Thus, a line on which system voltage VH attains to the maximum is shifted from W12 shown with a dashed line to W13 shown with a solid line on a high rotation speed side. Consequently, field-weakening control is started from a rotation speed higher than usual.

Figure 9:
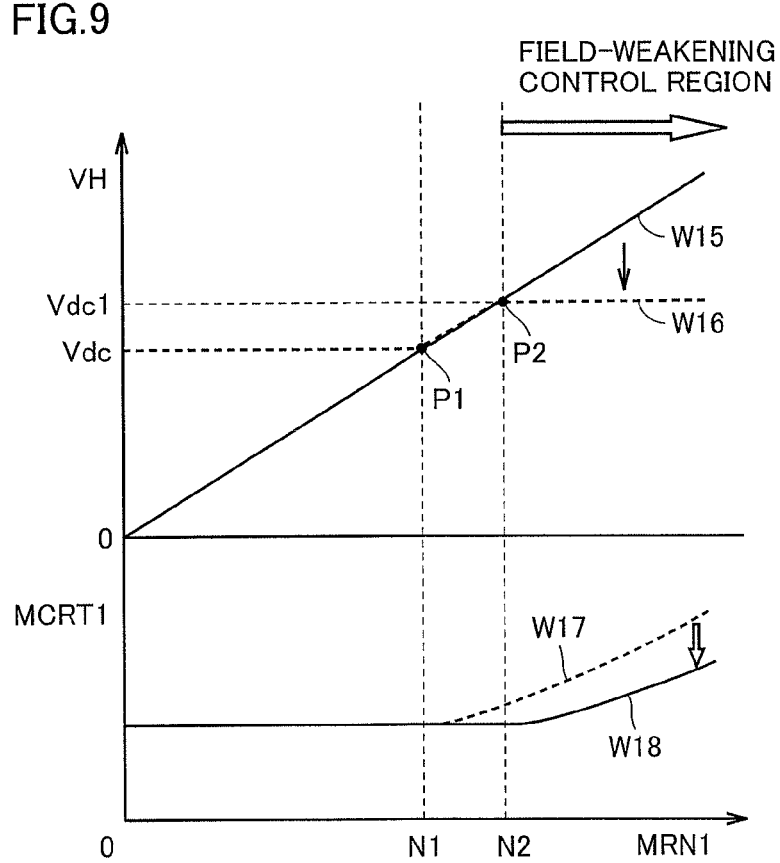
FIG. 9 is a diagram showing relation between a rotation speed of the AC motor and an induced voltage and a motor current generated in the AC motor when motor drive control in Embodiment 1 is applied.

FIG. 9 is a diagram showing one example of relation between rotation speed MRN1 of AC motor MG 1, and an induced voltage and motor current MCRT1 generated in AC motor MG1, which corresponds to FIG. 5, when motor drive control in present Embodiment 1 is applied.

Figure 7:
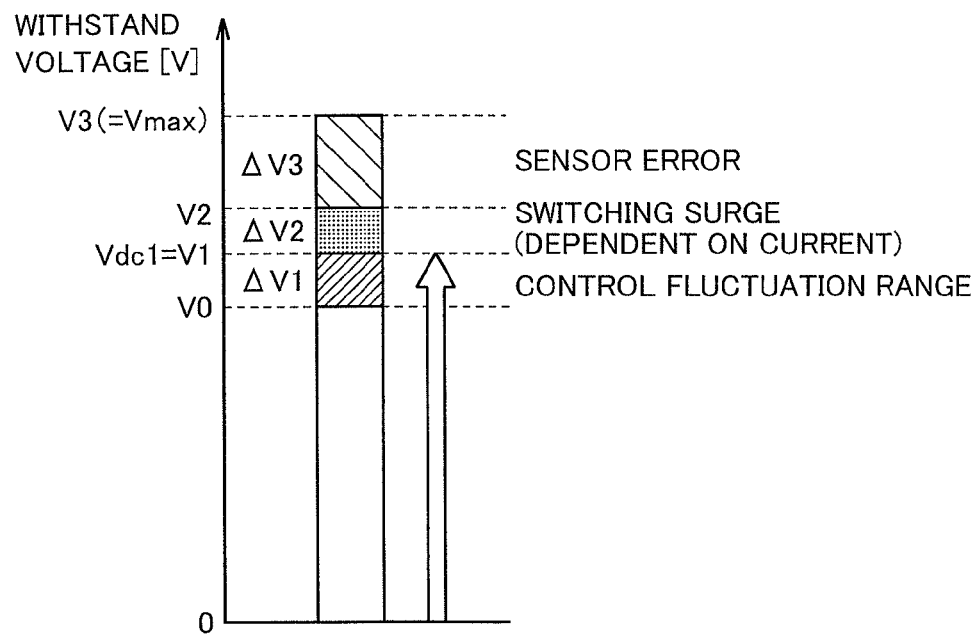
FIG. 7 is a diagram for illustrating a method for relaxing the maximum value of the system voltage in Embodiment 1.

Referring to FIG. 9, in such an operation state that a rotation speed is high and a torque command is low as shown with region RG1 in FIG. 8, the maximum value of system voltage VH is set to Vdc1 (=V1) as shown in FIG. 7. Thus, PWM control is continued until an induced voltage in the motor attains to a point P2 in FIG. 9, and field-weakening control is started from a time point when the induced voltage in the motor reached point P2. Thus, representation of motor current MCRT1 changes from a line W17 shown with a dashed line to a line W18 shown with a solid line. Consequently, an amount of a current to be increased for field-weakening control is decreased and loss on a high rotation speed side can be reduced.

Figure 10:
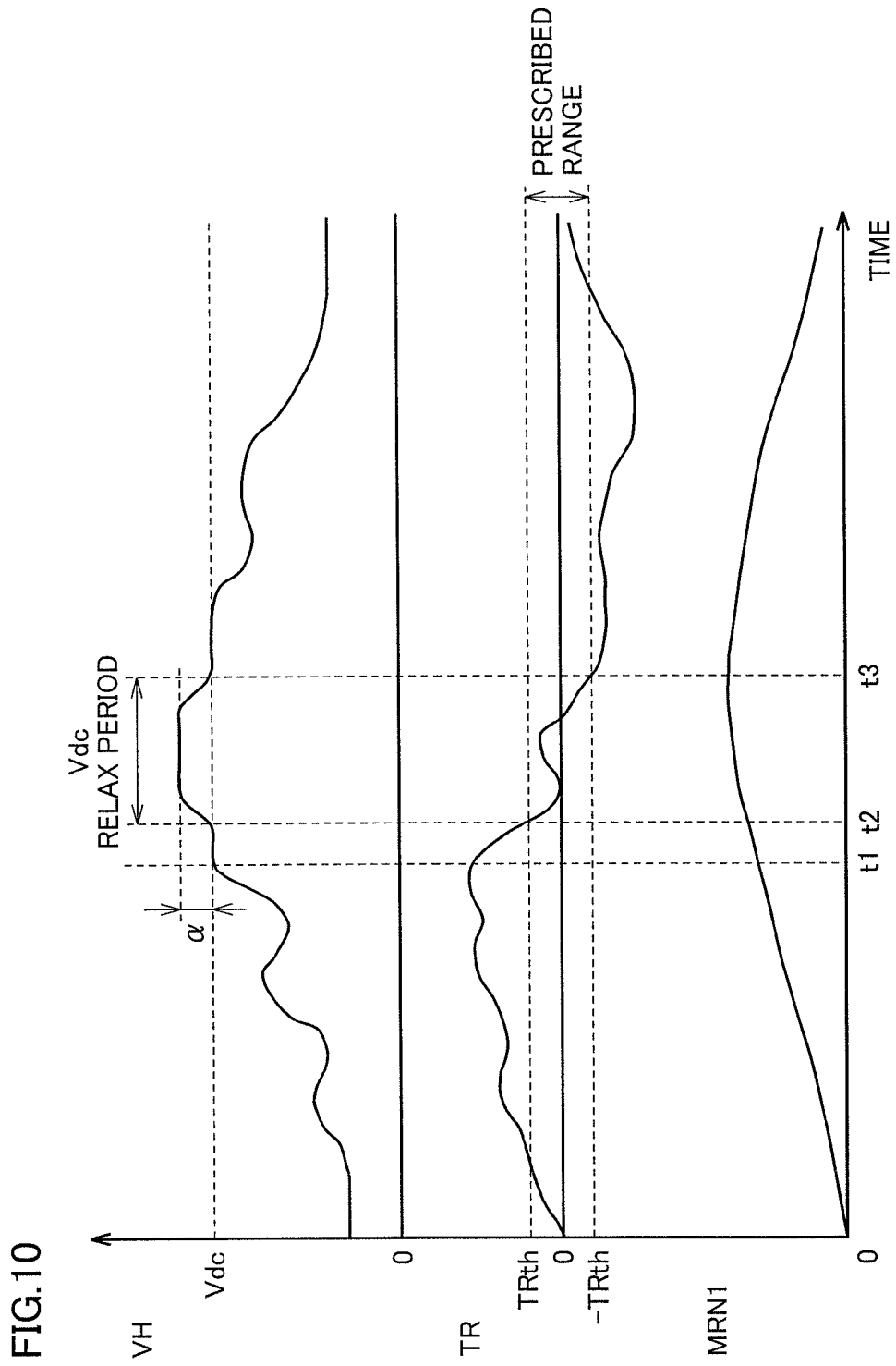
FIG. 10 is a time chart showing one example of relation among a system voltage, a torque command value, and a rotation speed when Embodiment 1 is applied.

FIG. 10 is a time chart showing one example of relation among system voltage VH, torque command value TR, and rotation speed MRN1 when present Embodiment 1 is applied. In FIG. 10, the abscissa represents a time and the ordinate represents system voltage VH, torque command value TR, and rotation speed MRN1.

Referring to FIG. 10, until a time t1, rotation speed MRN1 and torque command value TR tend to increase, and accordingly system voltage VH increases. Then, at the time point of time t1, system voltage VH reaches maximum value Vdc and system voltage VH is controlled so as not to exceed maximum value Vdc.

Then, torque command value TR gradually lowers, and at a time t2 when torque command value TR is within a prescribed range of |TR|≤TRth, the maximum value of system voltage VH is relaxed to Vdc+α. Accordingly, the step-up command value is increased and field-weakening control is started on a higher rotation speed side as described above. Thereafter, between time t2 and a time t3, torque command value TR is within the prescribed range and hence a state that the maximum value of system voltage VH is relaxed is maintained.

After time t3, since torque command value TR becomes smaller than a lower limit value −TRth of the prescribed range, the state that the maximum value of system voltage VH is relaxed is canceled and the maximum value again returns to Vdc.

Figure 11:
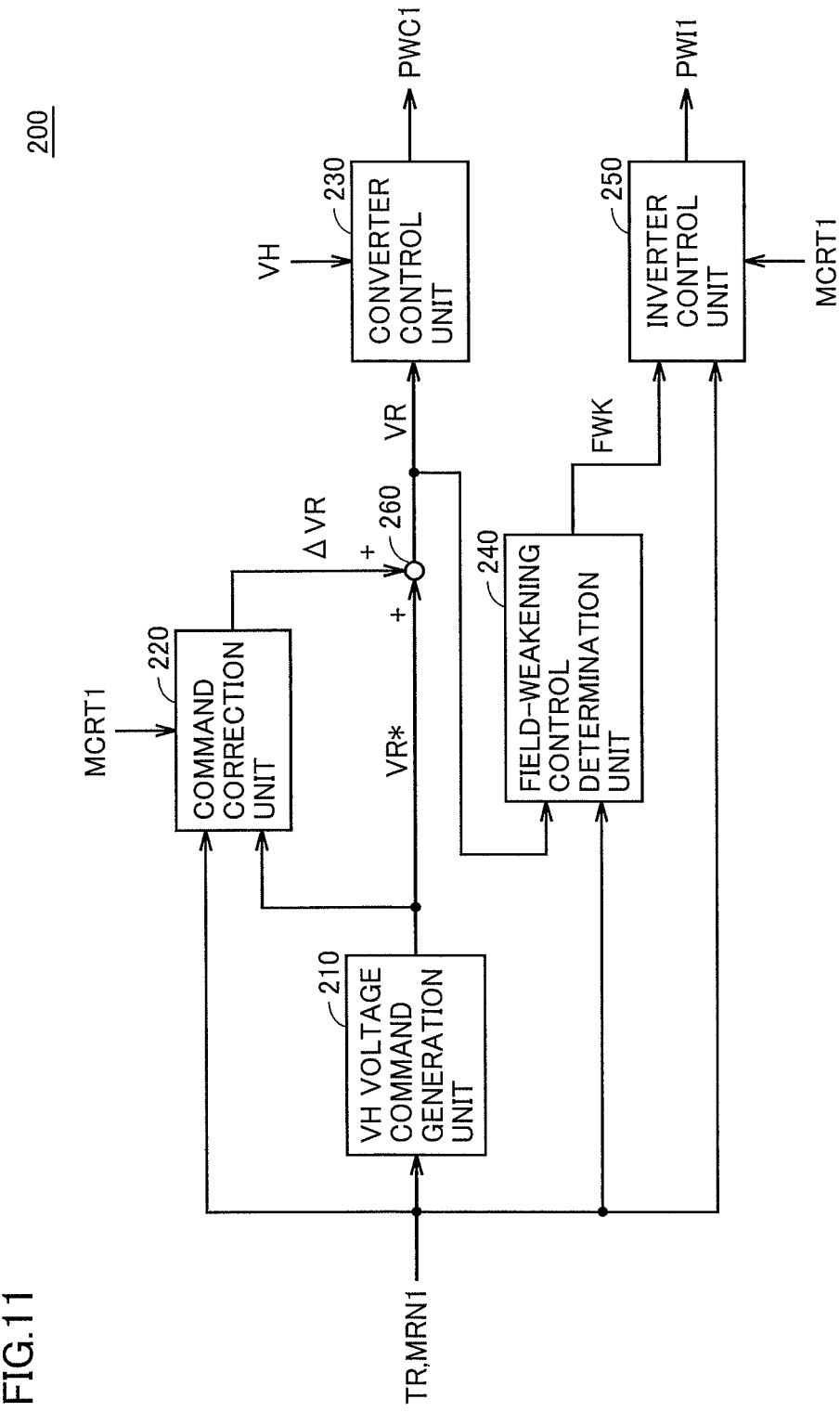
FIG. 11 is a functional block diagram for illustrating motor drive control carried out in a control device in Embodiment 1.

FIG. 11 is a functional block diagram for illustrating motor drive control carried out in control device 200 in FIG. 1 in present Embodiment 1. Each functional block shown in a functional block diagram described in connection with FIG. 11 and FIG. 25 which will be described later is implemented by hardware or software processing by control device 200.

Referring to FIGS. 1 and 11, control device 200 includes a VH voltage command generation unit 210, a command correction unit 220, a converter control unit 230, a field-weakening control determination unit 240, an inverter control unit 250, and an addition unit 260.

VH voltage command generation unit 210 receives torque command value TR and rotation speed MRN1 of AC motor MG1. Then, based on such information, VH voltage command generation unit 210 generates by operation, a voltage command value VR* for system voltage VH by referring to a map or the like stored in advance in VH voltage command generation unit 210. VH voltage command generation unit 210 outputs voltage command value VR* found by operation to command correction unit 220 and addition unit 260.

Command correction unit 220 receives torque command value TR and rotation speed MRN1 of AC motor MG1 as well as voltage command value VR* from VH voltage command generation unit 210. In addition, command correction unit 220 receives motor current MCRT1 of AC motor MG1. Based on such information, command correction unit 220 determines whether or not a region is a high-rotation-speed and low-torque region, for example, like region RG1 in FIG. 8 and whether or not voltage command value VR* has attained to maximum value Vdc of system voltage VH. When command correction unit 220 determines that the conditions above are satisfied, command correction unit 220 sets a correction amount ΔVR for relaxing maximum value Vdc of system voltage VH and increasing a voltage command value as described in connection with FIGS. 7 and 9. Command correction unit 220 outputs set correction amount ΔVR to addition unit 260. It is noted that, when correction is not necessary, correction amount ΔVR is set to zero.

Addition unit 260 receives voltage command value VR* from VH voltage command generation unit 210 and correction amount ΔVR from command correction unit 220. Then, addition unit 260 adds these to each other and outputs corrected voltage command value VR (=VR*+ΔVR) to converter control unit 230 and field-weakening control determination unit 240.

Converter control unit 230 receives corrected voltage command value VR from addition unit 260 and system voltage VH detected by voltage sensor 140. Then, converter control unit 230 carries out feedback control such that system voltage VH attains to corrected voltage command value VR, generates control signal PWC1, and outputs the signal to converter 120.

Field-weakening control determination unit 240 receives torque command value TR and rotation speed MRN1 of AC motor MG1 as well as corrected voltage command value VR from addition unit 260. Field-weakening control determination unit 240 determines whether or not to carry out field-weakening control based on torque command value TR and rotation speed MRN1, while maximum value Vdc of system voltage VH is relaxed and a voltage command value is increased (that is, while the field-weakening control region is shifted toward the high rotation speed side) as shown in FIGS. 8 and 9. Then, field-weakening control determination unit 240 sets a control signal FWK indicating the determination result and outputs the signal to inverter control unit 250. For example, control signal FWK is set to ON when field-weakening control is to be carried out and set to OFF when field-weakening control is not to be carried out.

Inverter control unit 250 receives torque command value TR and rotation speed MRN1 of AC motor MG1, control signal FWK from field-weakening control determination unit 240, and motor current MCRT1. Based on such information, inverter control unit 250 generates control signal PWI1 for driving inverter 130 and outputs the signal to inverter 130. Here, when control signal FWK is set to ON, inverter control unit 250 generates such control signal PWI1 as increasing a current in a direction weakening strength of the magnet in AC motor MG1.

Figure 12:
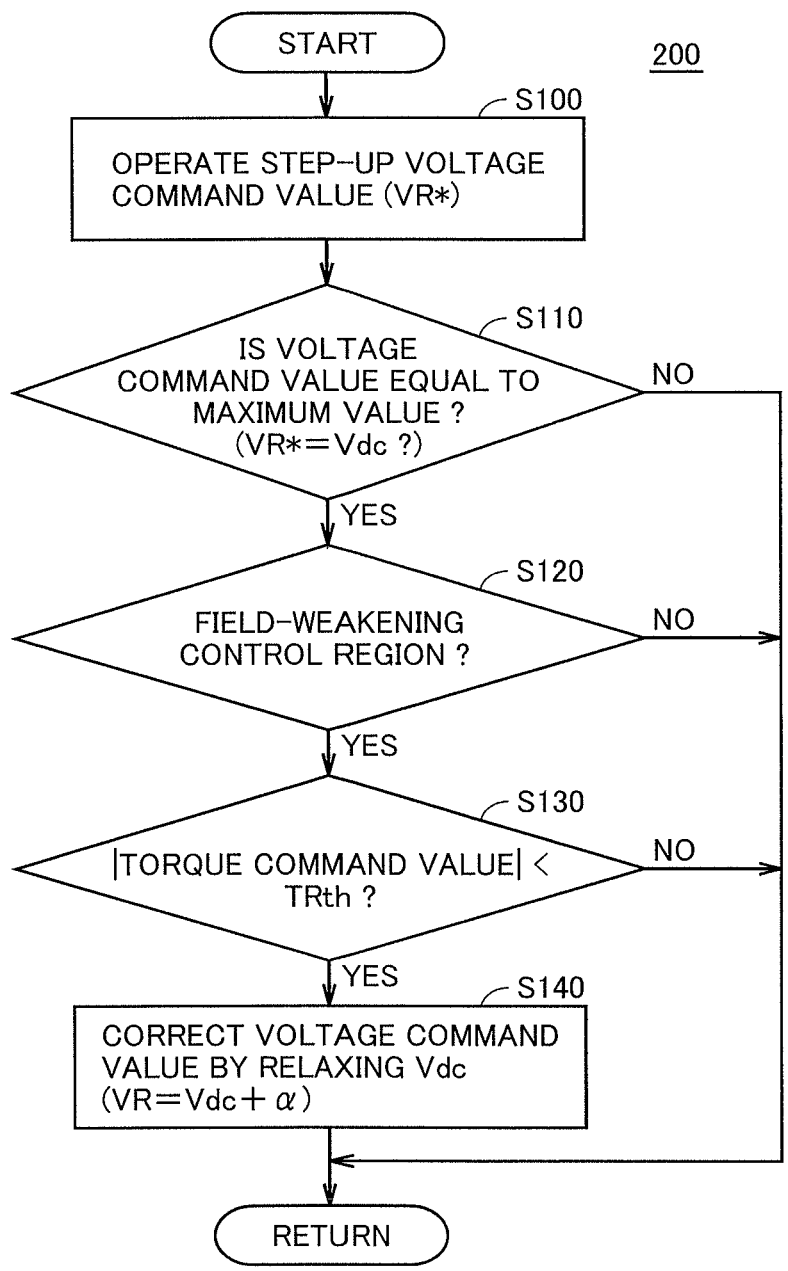
FIG. 12 is a flowchart for illustrating details of motor drive control processing performed in the control device in Embodiment 1.

FIG. 12 is a flowchart for illustrating details of motor drive control processing performed in control device 200 in Embodiment 1. Each step in the flowcharts shown in FIG. 12 and FIGS. 16, 21, 26, and 29 which will be described later is performed as a program stored in advance in control device 200 is called from a main routine and executed in a prescribed cycle. Alternatively, processing in some steps can also be performed by constructing dedicated hardware (electronic circuitry). It is noted that, in the flowchart in FIG. 12, processing performed in VH voltage command generation unit 210, command correction unit 220, and addition unit 260 in the functional block diagram in FIG. 11 will be described.

Referring to FIGS. 1 and 12, in step (hereinafter the step being abbreviated as S) 100, control device 200 generates a step-up voltage command value VR* for converter 120 through operation, based on torque command value TR and rotation speed MRN1 of AC motor MG1.

Then, in S110, control device 200 determines whether or not voltage command value VR* is equal to maximum value Vdc of system voltage VH.

When voltage command value VR* is equal to maximum value Vdc of system voltage VH (YES in S110), the process then proceeds to S120, where control device 200 uses, for example, a map as shown in FIG. 4 to determine whether or not the field-weakening control region where the maximum value of system voltage VH is Vdc is applicable, based on torque command value TR and rotation speed MRN1. It is noted that determination as the field-weakening region may be made based on whether or not switching to a rectangular wave control mode has been made based on the modulation factor, as described in connection with FIG. 2.

When determination as the field-weakening control region is made (YES in S120), the process proceeds to S130, where control device 200 determines whether or not an absolute value of torque command value TR is smaller than threshold value TRth.

When the absolute value of torque command value TR is smaller than threshold value TRth (YES in S130), control device 200 determines that maximum value Vdc of system voltage VH can be relaxed. Then, in S140, control device 200 sets a relaxed maximum value (Vdc+α) as corrected voltage command value VR for converter 120. It is noted that α described above corresponds to correction value ΔVR in FIG. 11.

Thereafter, the process returns to the main routine. Converter 120 is controlled based on corrected voltage command value VR, whether or not field-weakening control can be carried out is determined, and inverter 130 is controlled.

When voltage command value VR* is not equal to maximum value Vdc of system voltage VH (NO in S110), when determination as the field-weakening control region has not been made (NO in S120), or when the absolute value of torque command value TR is equal to or greater than threshold value TRth (NO in S130), correction of voltage command value VR* is unnecessary in each case and hence the process returns to the main routine. Then, whether or not field-weakening control can be carried out is determined based on voltage command value VR* before correction, and converter 120 and inverter 130 are controlled.

By carrying out control in accordance with the processing as described above, in a case of a low torque command, a current for field-weakening control is reduced while an operation of the motor is continued up to a high rotation speed, so that efficiency of the motor drive system can be improved without uncontrollability.

[Embodiment 2]

In Embodiment 1, a method has been described, with which, in a case of a low torque command, an amount comparable to voltage fluctuation originating from control fluctuation is relaxed in maximum value Vdc of system voltage VH, so that a step-up command value is increased to shift the field-weakening control region toward the higher-speed side and efficiency is improved.

In Embodiment 2, a method will further be described, with which, a step-up command value is increased by an amount comparable to voltage fluctuation originating from switching surge caused at the time when an inverter or a converter performs a switching operation, in consideration of magnitude of a current that flows in the inverter or the converter, so that efficiency is further improved.

Figure 13:
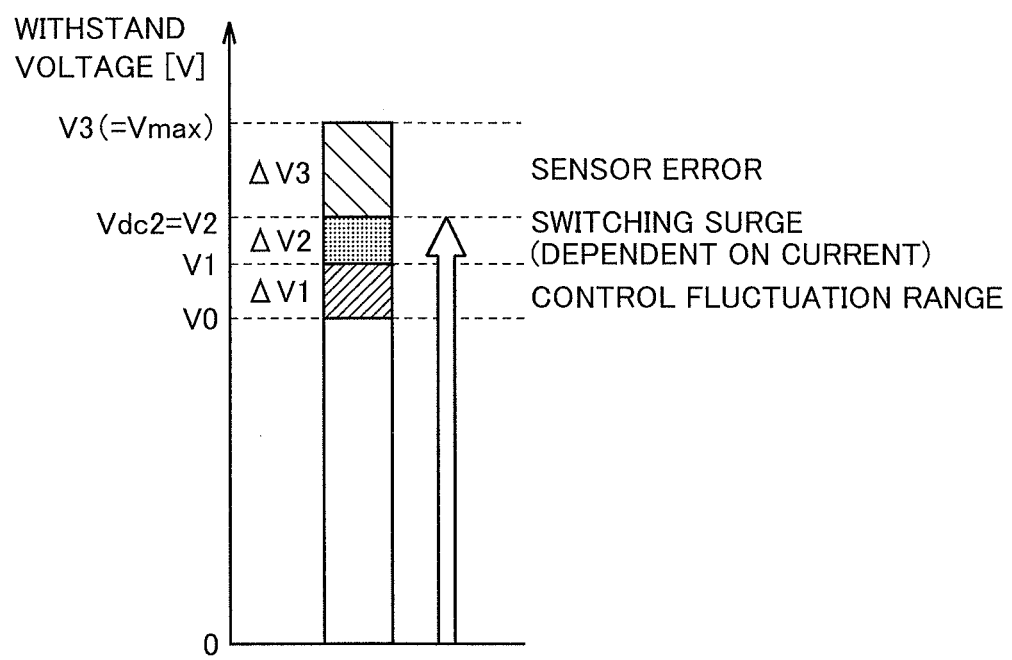
FIG. 13 is a diagram for illustrating a method for relaxing a maximum value of a system voltage in Embodiment 2.

FIG. 13 is a diagram showing a withstand voltage of a switching element included in an inverter or a converter as in FIGS. 6 and 7. In Embodiment 2, the step-up command value is increased to a voltage V2 at the maximum, by relaxing maximum value Vdc of system voltage VH not only for ΔV1 representing an amount of voltage fluctuation originating from control fluctuation in Embodiment 1 but also for an amount of voltage fluctuation ΔV2 originating from switching surge.

Figure 14:
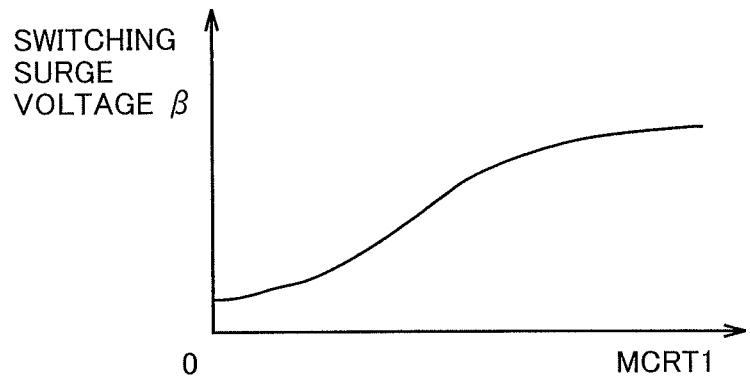
FIG. 14 is a diagram showing one example of relation between a motor current and a switching surge voltage generated by a switching operation at that time in an inverter.

FIG. 14 is a diagram showing one example of relation between motor current MCRT1 and a switching surge voltage β generated by a switching operation at that time in inverter 130. As can be seen in FIG. 14, switching surge voltage β generally increases with increase in motor current MCRT1.

Figure 15:
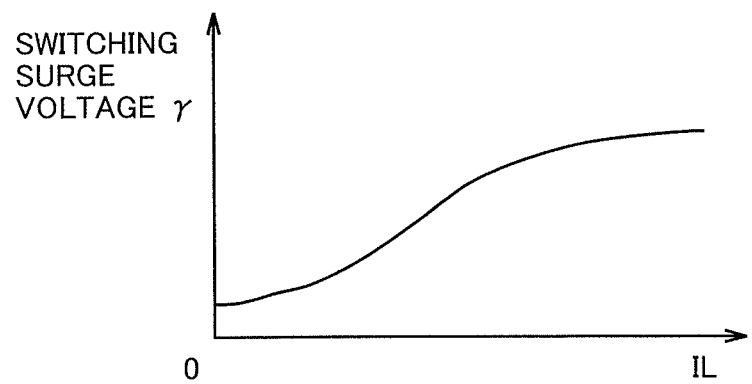
FIG. 15 is a diagram showing one example of relation between a reactor current that flows through a reactor and a switching surge current generated by a switching operation at that time in a converter.

In addition, FIG. 15 is a diagram showing one example of relation between a reactor current IL that flows through reactor L1 and a switching surge voltage γ generated by a switching operation at that time in converter 120. In converter 120 as well, switching surge voltage γ increases with increase in reactor current IL as in the case of inverter 130.

A map showing relation as in these FIGS. 14 and 15 is found in advance through experiments and the like, and a switching surge voltage in accordance with a current during operation of the motor is estimated based on these maps. Then, maximum value Vdc of system voltage VH is relaxed for an amount comparable to voltage fluctuation corresponding to a smaller one of estimated switching surge voltages of inverter 130 and converter 120.

In a case where a switching surge voltage of converter 120 is estimated, with regard to reactor current IL in converter 120 shown in FIG. 15, a value obtained by converting motor current MCRT1 which is an AC current to a DC current may be used as reactor current IL for estimation. Alternatively, although not shown in FIG. 1, a current sensor may be provided between reactor L1 and system relay SR1 and an actual reactor current IL detected by the current sensor may be used.

Figure 16:
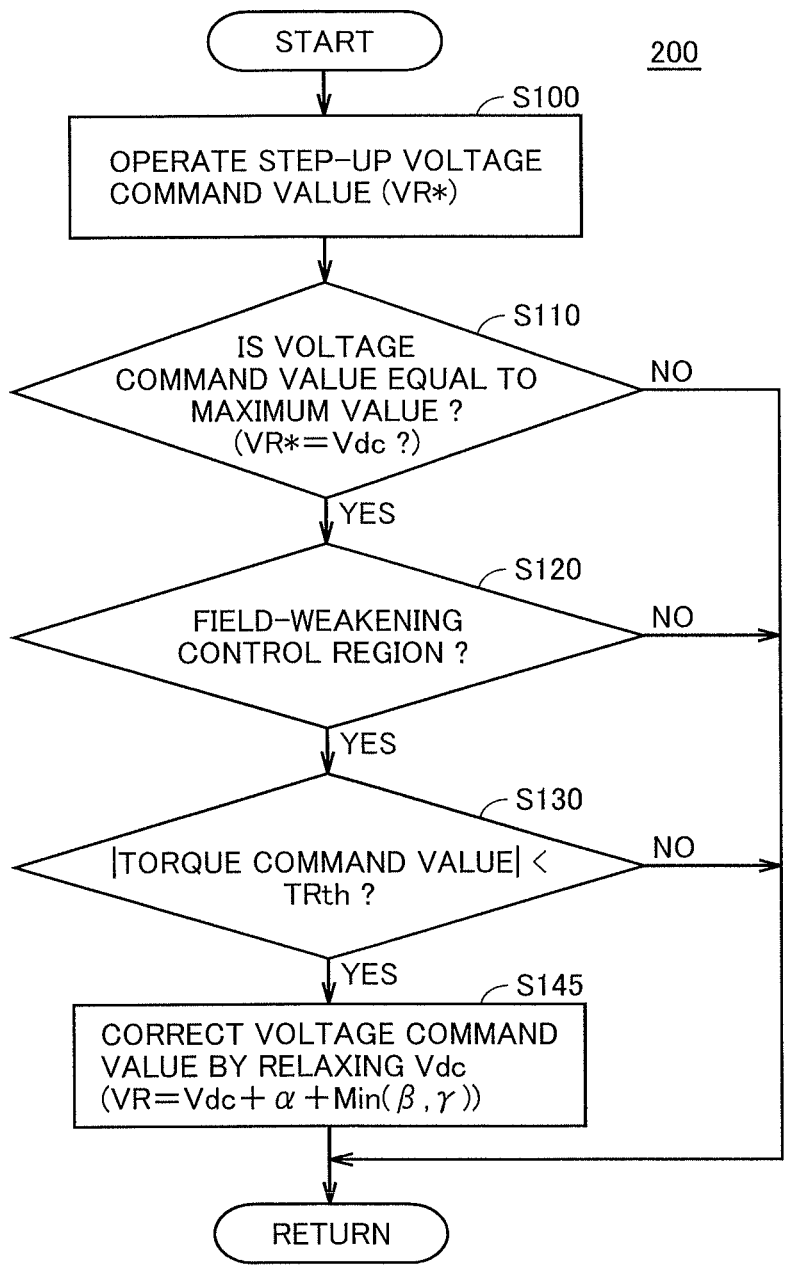
FIG. 16 is a flowchart for illustrating details of motor drive control processing performed in a control device in Embodiment 2.

FIG. 16 is a flowchart for illustrating details of motor drive control processing performed in control device 200 in Embodiment 2. In FIG. 16, step S140 in the flowchart shown in FIG. 12 in Embodiment 1 has been replaced with S145. Description of the steps in FIG. 16 the same as in FIG. 12 will not be repeated.

Referring to FIGS. 1 and 16, when step-up voltage command value VR* for converter 120 is equal to maximum value Vdc of system voltage VH (YES in S110), when the field-weakening control region is applicable (YES in S120), and when the absolute value of torque command value TR is smaller than threshold value TRth (YES in S130), the process proceeds to S145. Control device 200 finds by operation, from the map as in FIGS. 14 and 15, switching surge voltages β and γ estimated to be generated in inverter 130 and converter 120 respectively, based on motor current MCRT1 and reactor current IL. Then, control device 200 sets a maximum value of relaxed system voltage VH (Vdc+α+Min(β, γ)) as corrected voltage command value VR for converter 120. Thereafter, the process returns to the main routine. Converter 120 is controlled based on corrected voltage command value VR, whether field-weakening control can be carried out or not is determined, and inverter 130 is controlled.

It is noted that, though increase by a correction amount α for voltage fluctuation originating from control fluctuation described in Embodiment 1 is also given in S145, increase only by voltage fluctuation originating from switching surge described above may be given.

By carrying out control in accordance with the processing as above, in a case of a low torque command, a current for field-weakening control is reduced while an operation of the motor is continued up to a high rotation speed, so that efficiency of the motor drive system can be improved without uncontrollability.

[Embodiment 3]

In Embodiment 1 and Embodiment 2, a method with which, in a case of a low torque command, maximum value Vdc of system voltage VH is relaxed by an amount of voltage fluctuation originating from control fluctuation and switching surge to thereby increase a step-up command value, has been described.

In Embodiment 3, a method will be described, with which, by making use of the fact that a current that flows in an AC motor is very low in particular in such a state that a torque command value is substantially zero, system voltage VH is not restricted with a switching operation being stopped.

Figure 17:
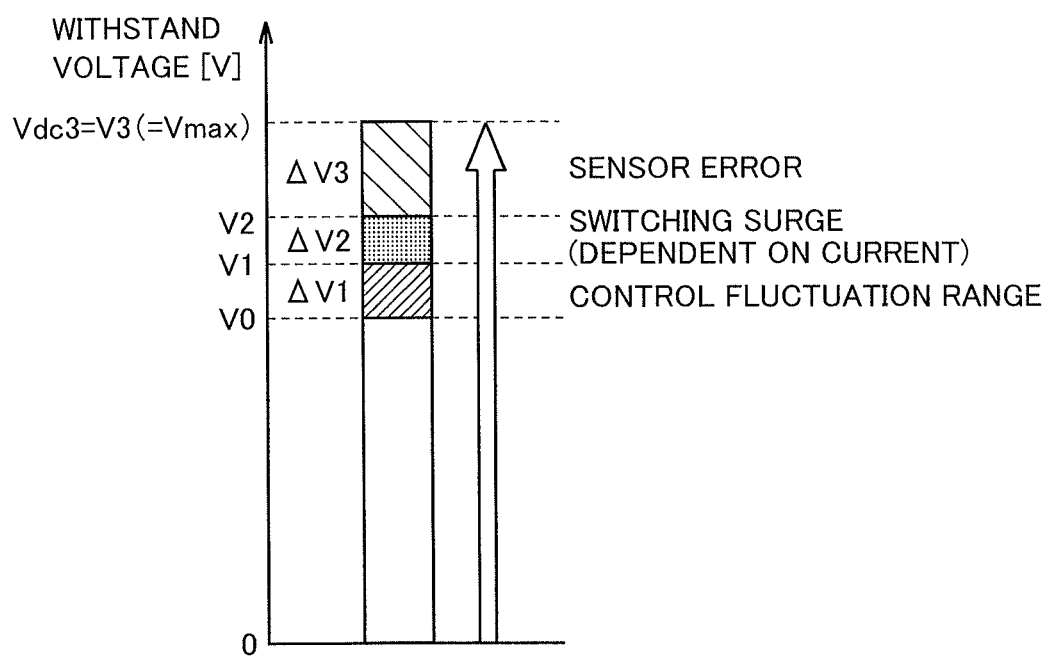
FIG. 17 is a diagram for illustrating outlines of Embodiment 3.

FIG. 17 is a diagram for illustrating outlines of Embodiment 3, and it is a diagram showing a withstand voltage of a switching element included in an inverter and/or a converter, as in FIGS. 7 and 13 in Embodiment 1 and Embodiment 2.

Referring to FIG. 17, in Embodiment 1 and Embodiment 2, voltage fluctuation ΔV1 originating from control fluctuation and voltage fluctuation ΔV2 originating from switching surge are relaxed, however, in any case, switching control based on a detection value from a voltage sensor or a current sensor is continually carried out and hence relaxing is difficult with regard to voltage fluctuation ΔV3 originating from a sensor error. If a switching operation is stopped, however, it is no longer necessary to take into account a sensor error. Therefore, maximum value Vdc of system voltage VH can be relaxed to a rated withstand voltage (Vmax) of a switching element. Here, a rated withstand voltage of a switching element is generally designed such that, in a case where a switching element is not driven, it can withstand an induced voltage at the time when an AC motor has attained the maximum rotation speed. Therefore, in other words, relaxation of maximum value Vdc of system voltage VH to a rated withstand voltage of a switching element corresponds to allowing an induced voltage naturally generated in an AC motor.

Figure 18:
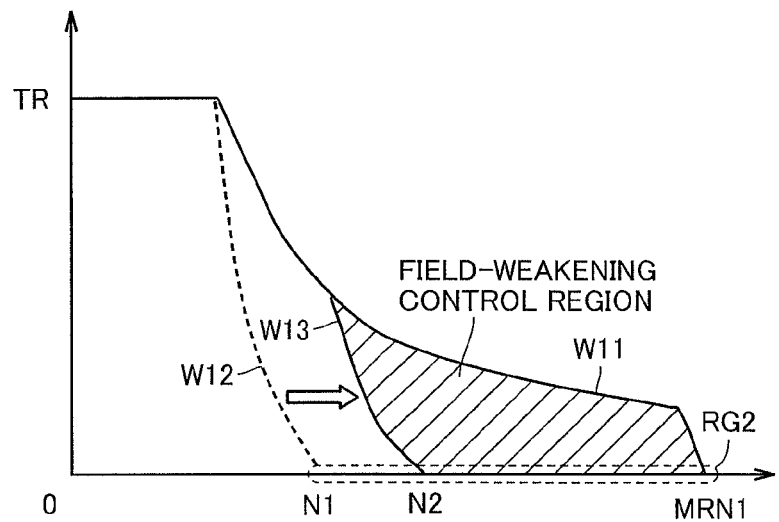
FIG. 18 is a diagram showing relation between a torque command value and a rotation speed in Embodiment 3.

A range of interest in present Embodiment 3 corresponds, in the diagram showing relation between torque command value TR and rotation speed MRN1 in FIG. 18, to a region where torque command value TR is zero or a region very close thereto, that is, a region RG2 in FIG. 18, in the field-weakening control region in a case where maximum value Vdc of system voltage VH is not relaxed.

Figure 19:
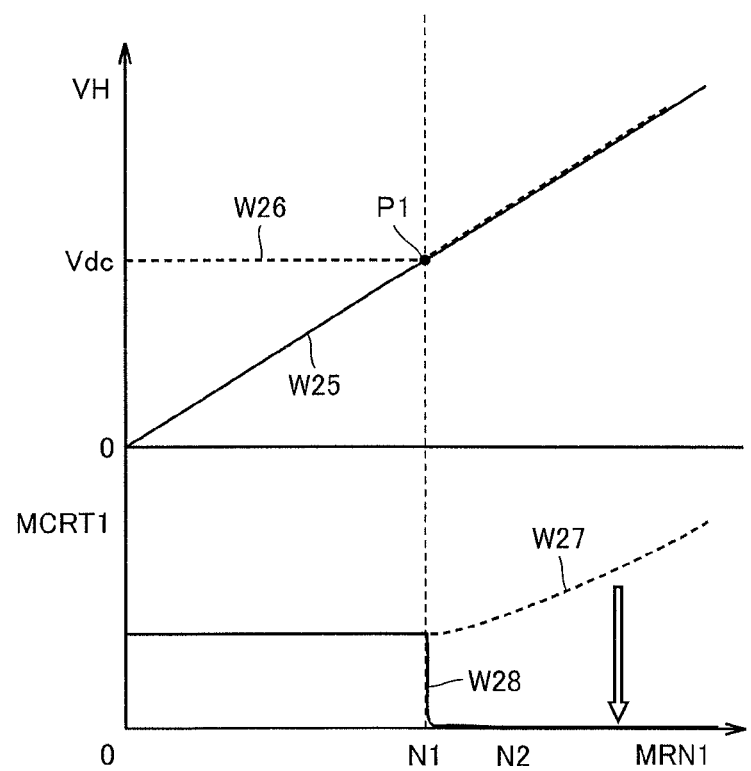
FIG. 19 is a diagram showing relation between a rotation speed of an AC motor and an induced voltage and a motor current generated in the AC motor in Embodiment 3.

FIG. 19 is a diagram showing relation between rotation speed MRN1 of AC motor MG1, and an induced voltage and motor current MCRT1 generated in AC motor MG1 in Embodiment 3. As shown in FIG. 19, in Embodiment 3, at the time point when an induced voltage generated in AC motor MG1 attains to maximum value Vdc of system voltage VH (point P1 in FIG. 17), a switching operation of converter 120 and inverter 130 is stopped. Consequently, since system voltage VH is no longer controlled, maximum value Vdc of system voltage VH is relaxed to a rated withstand voltage of the switching element.

Thus, since an induced voltage in AC motor MG1 increases without being restricted but a switching operation is not performed, motor current MCRT1 does not flow.

Figure 20:
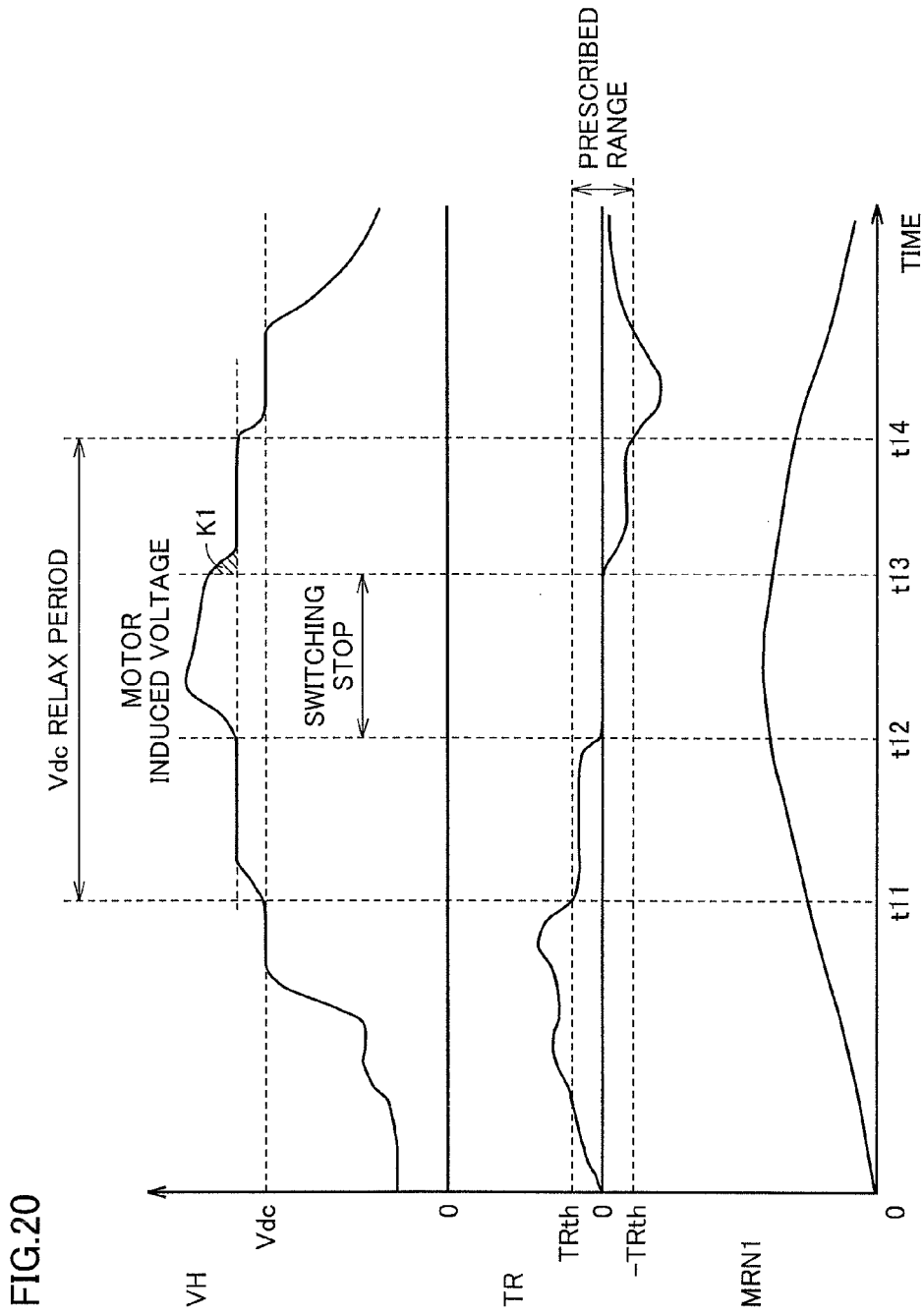
FIG. 20 is a time chart showing one example of relation among a system voltage, a torque command value, and a rotation speed when Embodiment 3 is applied.

FIG. 20 is a time chart showing one example of relation among system voltage VH, torque command value TR, and rotation speed MRN1 when Embodiment 3 is applied.

Referring to FIG. 20, an operation of the motor starts from a time 0. Until a time t11, rotation speed MRN1 and torque command value TR gradually increase and correspondingly system voltage VH also increases to maximum value Vdc.

When torque command value TR is within a prescribed range at time t11, as in Embodiment 1 and Embodiment 2, maximum value Vdc of system voltage VH is relaxed for voltage fluctuation originating from control fluctuation and/or for switching surge.

Then, at the time point when torque command value TR is substantially zero at a time t12, the switching operation of converter 120 and inverter 130 is stopped. Thus, system voltage VH is uncontrolled, and hence system voltage VH increases to an induced voltage naturally resulting in AC motor MG1.

Thereafter, when torque command value TR is no longer zero at a time t13, a switching operation of converter 120 and inverter 130 is resumed and the maximum value of system voltage VH is restricted to a voltage relaxed for voltage fluctuation originating from control fluctuation and/or for switching surge.

Then, at a time t14 when a torque command value is out of the prescribed range, the maximum value of system voltage VH is set to Vdc.

Figure 21:
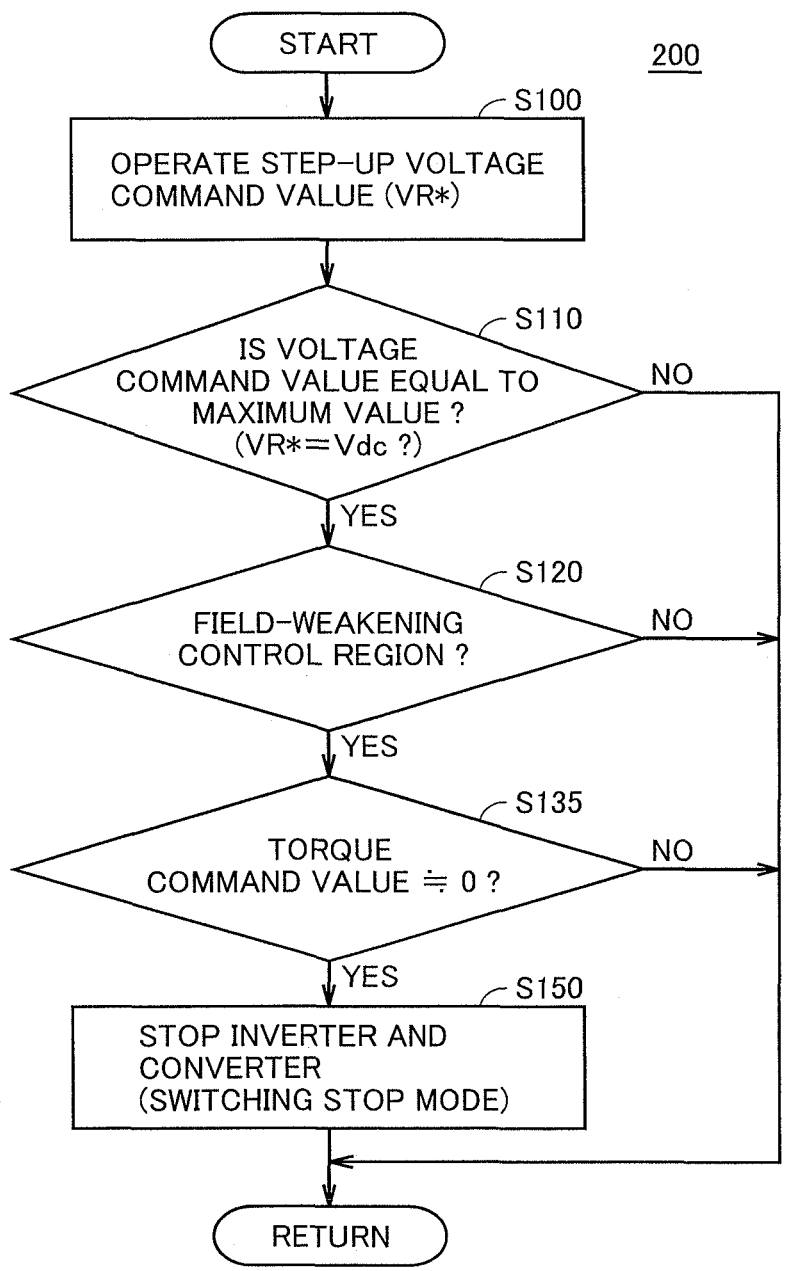
FIG. 21 is a flowchart for illustrating details of motor drive control processing performed in the control device in Embodiment 3.

FIG. 21 is a flowchart for illustrating details of motor drive control processing performed in control device 200 in Embodiment 3. In FIG. 21, steps S130 and S140 in the flowchart shown in FIG. 12 in Embodiment 1 have been replaced with S135 and S150, respectively. Description of the steps in FIG. 21 the same as in FIG. 12 will not be repeated.

Referring to FIGS. 1 and 21, when step-up voltage command value VR* for converter 120 is equal to maximum value Vdc of system voltage VH (YES in S110) and when determination as the field-weakening control region is made (YES in S120), the process proceeds to S135. In S135, control device 200 determines whether or not torque command value TR is substantially zero.

When torque command value TR is substantially zero (YES in S135), the process proceeds to S150 and control device 200 stops a switching operation of converter 120 and inverter 130 (a switching stop mode).

When torque command value TR is not substantially zero (NO in S135), the process returns to the main routine.

It is noted that, as in the example in FIG. 20, control in present Embodiment 3 may be applied in combination with Embodiment 1 and/or Embodiment 2.

By carrying out control in accordance with the processing as above, when a torque command value is substantially zero in the field-weakening control region, the converter and the inverter are stopped to thereby cut off a motor current that flows in the AC motor. Thus, efficiency of the motor drive system can be improved.

[Embodiment 4]

A method of stopping a switching operation of an inverter and a converter in a case where a torque command value is substantially zero has been described in Embodiment 3. With this method, while the switching operation remains stopped as described above, system voltage VH increases to an induced voltage naturally resulting in the AC motor. Then, when a condition that the torque command value is substantially zero is canceled, the switching operation is resumed. Here, however, if the switching operation is resumed before system voltage VH that has increased to the induced voltage lowers to a prescribed maximum value or lower (for example, a region K1 in FIG. 20), system voltage VH may exceed a rated withstand voltage of a switching element due to a sensor error, control fluctuation, or the like.

Therefore, Embodiment 4 is designed such that a rated withstand voltage of switching element Q1, Q2 included in converter 120 controlling system voltage VH is higher than a rated withstand voltage of switching elements Q3 to Q8 included in inverter 130.

Figure 22:
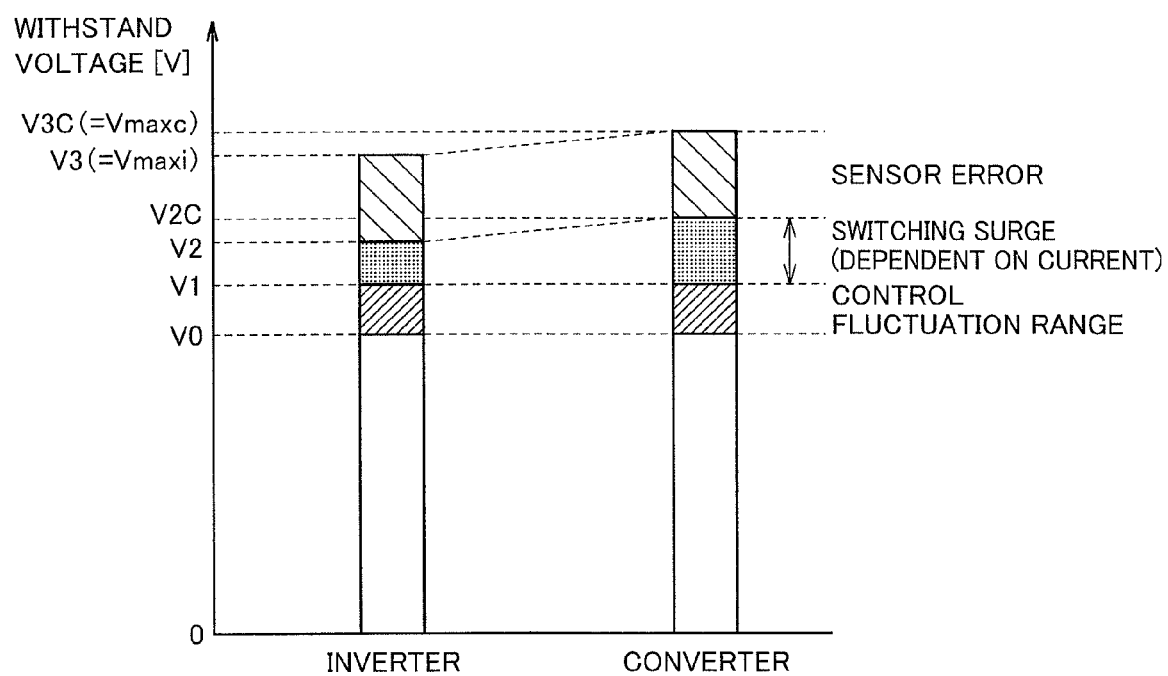
FIG. 22 is a diagram showing comparison of withstand voltages of a converter and an inverter in Embodiment 4.

FIG. 22 is a diagram for illustrating outlines of Embodiment 4, and it shows comparison of withstand voltages of converter 120 and inverter 130.

Referring to FIG. 22, in Embodiment 4, in designing a withstand voltage of switching element Q1, Q2 included in converter 120, a rated withstand voltage V3C is set in consideration of voltage fluctuation corresponding to switching surge that may be caused when a switching operation is started while system voltage VH has not lowered to a prescribed maximum value or lower.

By doing so, in returning from the switching stop mode in Embodiment 3, a switching operation can quickly be resumed without the withstand voltage of the switching element being exceeded.

Though a case where a rated withstand voltage of a switching element included in a converter is designed to be higher than that of an inverter has been described above, to the contrary, a withstand voltage of a switching element included in an inverter can also be designed to be higher than that of a converter so that an induced voltage of an AC motor can quickly be lowered by an inverter when a switching operation is resumed.

As can be seen in FIG. 1, however, the number of switching elements included in an inverter (three pairs) is greater than the number of switching elements included in a converter (one pair). Therefore, increase in withstand voltage of a switching element in a converter having the smaller number of switching elements is more inexpensive and hence suitable.

[Embodiment 5]

In Embodiment 4, a method of designing a rated withstand voltage of a switching element to be higher in consideration of fluctuation in system voltage in resuming a switching operation has been described.

Figure 23:
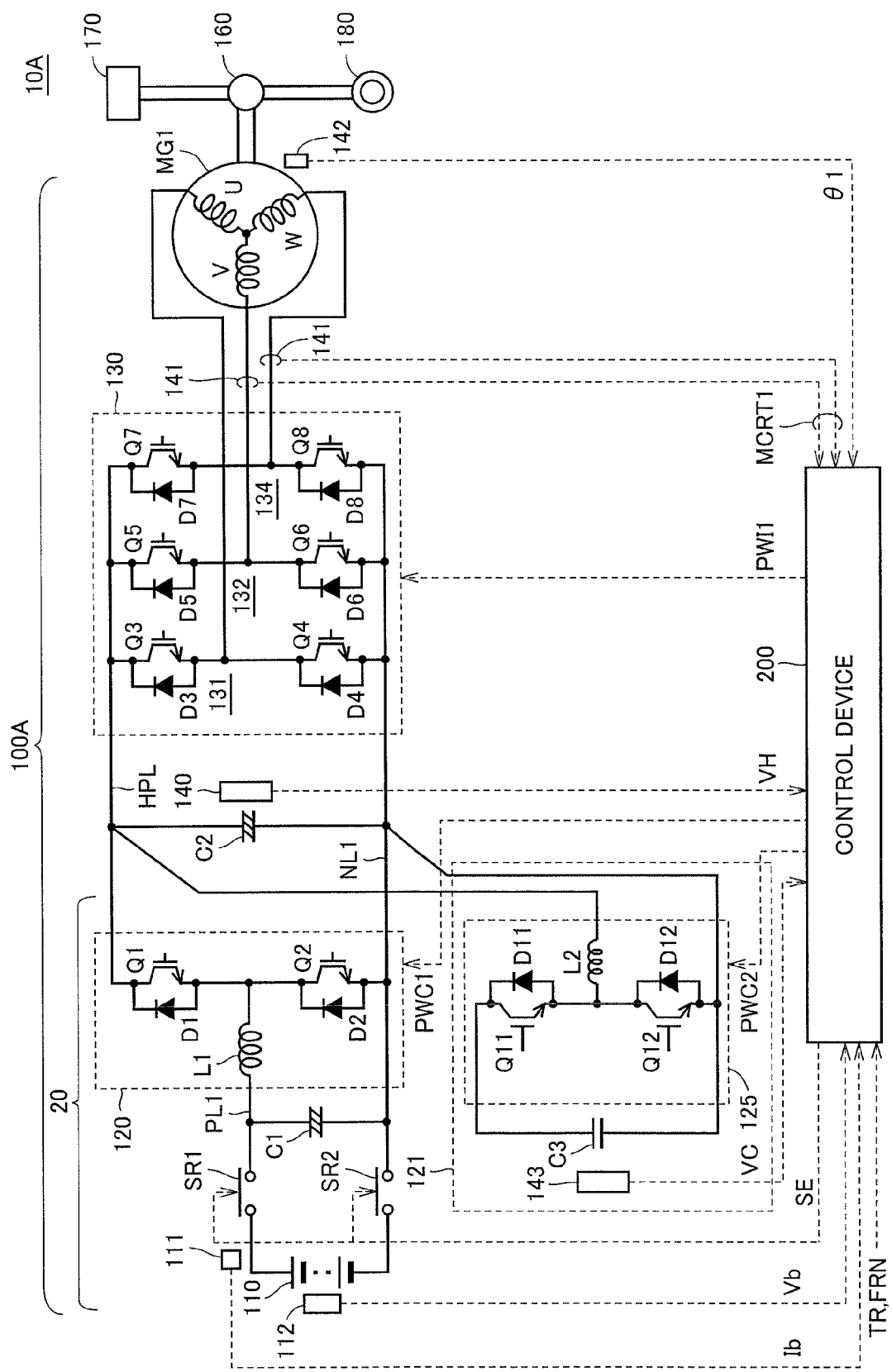
FIG. 23 is an overall configuration diagram of a vehicle incorporating a motor drive system to which a control device for an AC motor according to Embodiment 5 is applied.

As shown in FIG. 23, some motor drive systems include a buffer circuit 121 including a capacitor C3, which is connected to inverter 130 in parallel to converter 120. This buffer circuit 121 is a circuit for preventing supply of excessive electric power in a short period of time to DC power supply 110 by temporarily storing some electric power, for example, in such a case that excessive regenerative electric power is generated due to sudden deceleration.

In Embodiment 5, a method of quickly lowering a system voltage that has increased to an induced voltage to a prescribed maximum value or lower by driving this buffer circuit when a condition of a torque command value being substantially zero is canceled, in a case where Embodiment 3 is applied to a motor drive system configured to include such a buffer circuit, will be described.

By doing so, a switching operation can quickly be resumed in Embodiment 3 without a withstand voltage of a switching element included in a converter being increased.

FIG. 23 is an overall configuration diagram of a vehicle 10A incorporating a motor drive system 100A to which a control device for an AC motor according to Embodiment 5 is applied. In FIG. 23, buffer circuit 121 is added to motor drive system 100 in FIG. 1, as described above. Description of elements in FIG. 23 the same as in FIG. 1 will not be repeated.

Referring to FIG. 23, buffer circuit 121 includes switching elements Q11, Q12, diodes D11, D12, a reactor L2, capacitor C3, and a voltage sensor 143.

Switching elements Q11, Q12 connected in series are connected in parallel to capacitor C3. Diodes D11, D12 are connected to switching elements Q11, Q12 in anti-parallel thereto, respectively. Reactor L2 has one end connected to a connection node of switching elements Q11, Q12 and the other end connected to a connection node of power line HPL and capacitor C2. In addition, a collector of switching element Q12 is connected to a connection node of ground line NL1 and capacitor C2.

Voltage sensor 143 detects a voltage applied to capacitor C3 and outputs a detection value VC to control device 200.

Switching elements Q11, Q12, diodes D11, D12, and reactor L2 constitute a converter 125. In converter 125, ON and OFF of switching elements Q11, Q12 is controlled by a control signal PWC2 from control device 200, and converter 125 steps up system voltage VH between power line HPL and ground line NL1 to thereby charge capacitor C3. Alternatively, converter 125 is controlled by control signal PWC2 and it steps down electric power stored in capacitor C3 for supply to power line HPL and ground line NL1.

Since converter 125 operates on the premise that system voltage VH is high, a withstand voltage of switching element Q11, Q12 is generally designed to be higher than a withstand voltage of a switching element included in converter 120 and inverter 130.

Outlines of control in Embodiment 5 will now be described with reference to FIG. 24.

Figure 24:
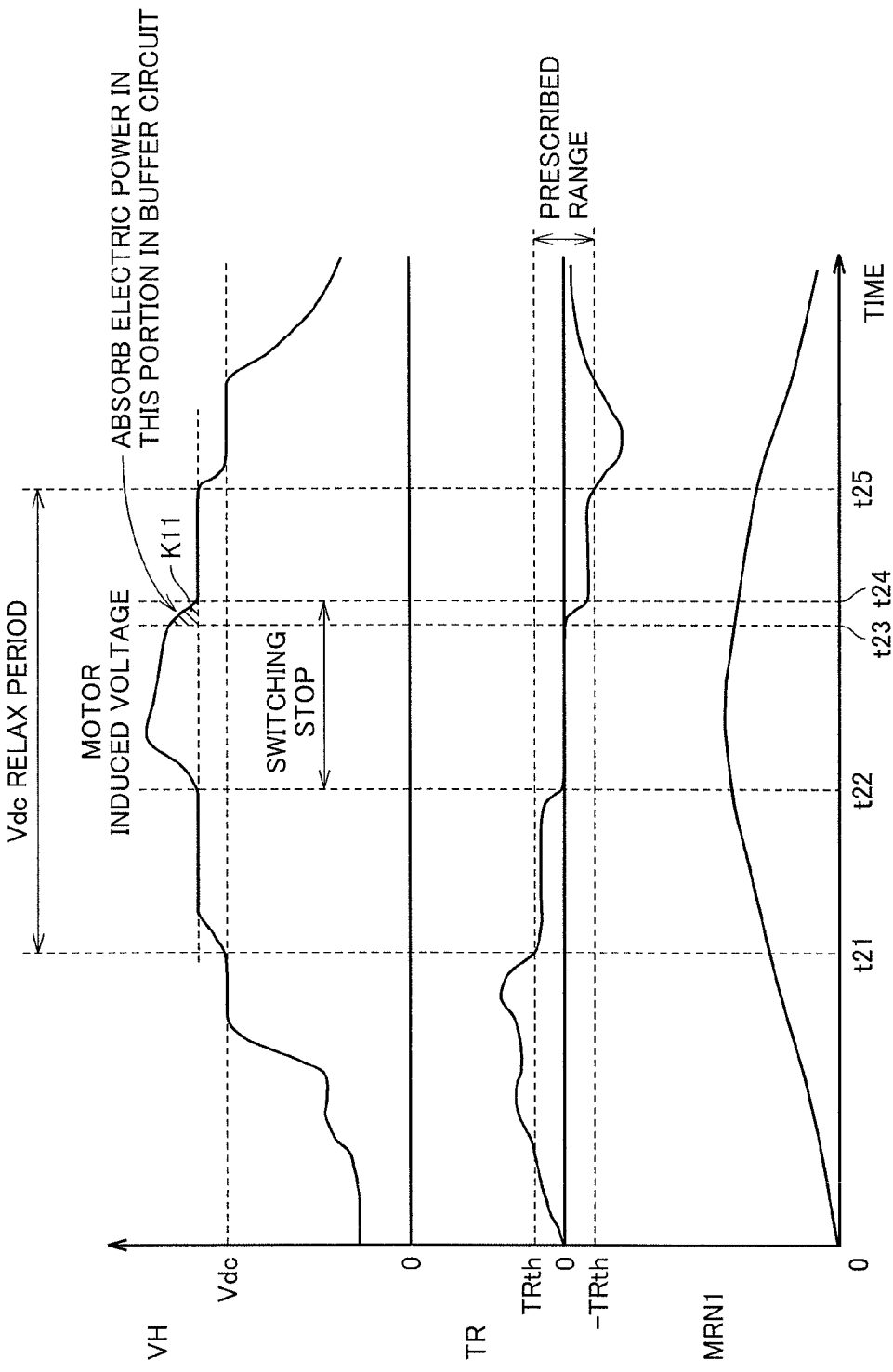
FIG. 24 is a time chart showing one example of relation among a system voltage, a torque command value, and a rotation speed when Embodiment 5 is applied.

FIG. 24 is a time chart showing one example of relation among system voltage VH, torque command value TR, and rotation speed MRN1 when Embodiment 5 is applied.

Since the description of status until time t12 in FIG. 20 in Embodiment 3 is also applicable to status until a time t22, the description will not be repeated.

In response to the fact that torque command value TR is substantially zero at time t22, a switching operation of converter 120 and inverter 130 is stopped. Thus, system voltage VH increases to an induced voltage in AC motor MG1.

Though such a state that torque command value TR is substantially zero is canceled at a time t23, a state that the switching operation remains stopped continues in Embodiment 5. Then, here, buffer circuit 121 is driven by control device 200 and electric power shown with a region K11 in FIG. 24 is stored in capacitor C3 in buffer circuit 121.

Thereafter, at a time t24 when system voltage VH attains to a relaxed prescribed maximum value or lower, buffer circuit 121 is stopped and a switching operation of converter 120 and inverter 130 is resumed.

It is noted that electric power stored in capacitor C3 is stepped down by converter 125 at appropriate timing after system voltage VH is lower than Vdc and resultant electric power is supplied to power line HPL and ground line NL1.

Figure 25:
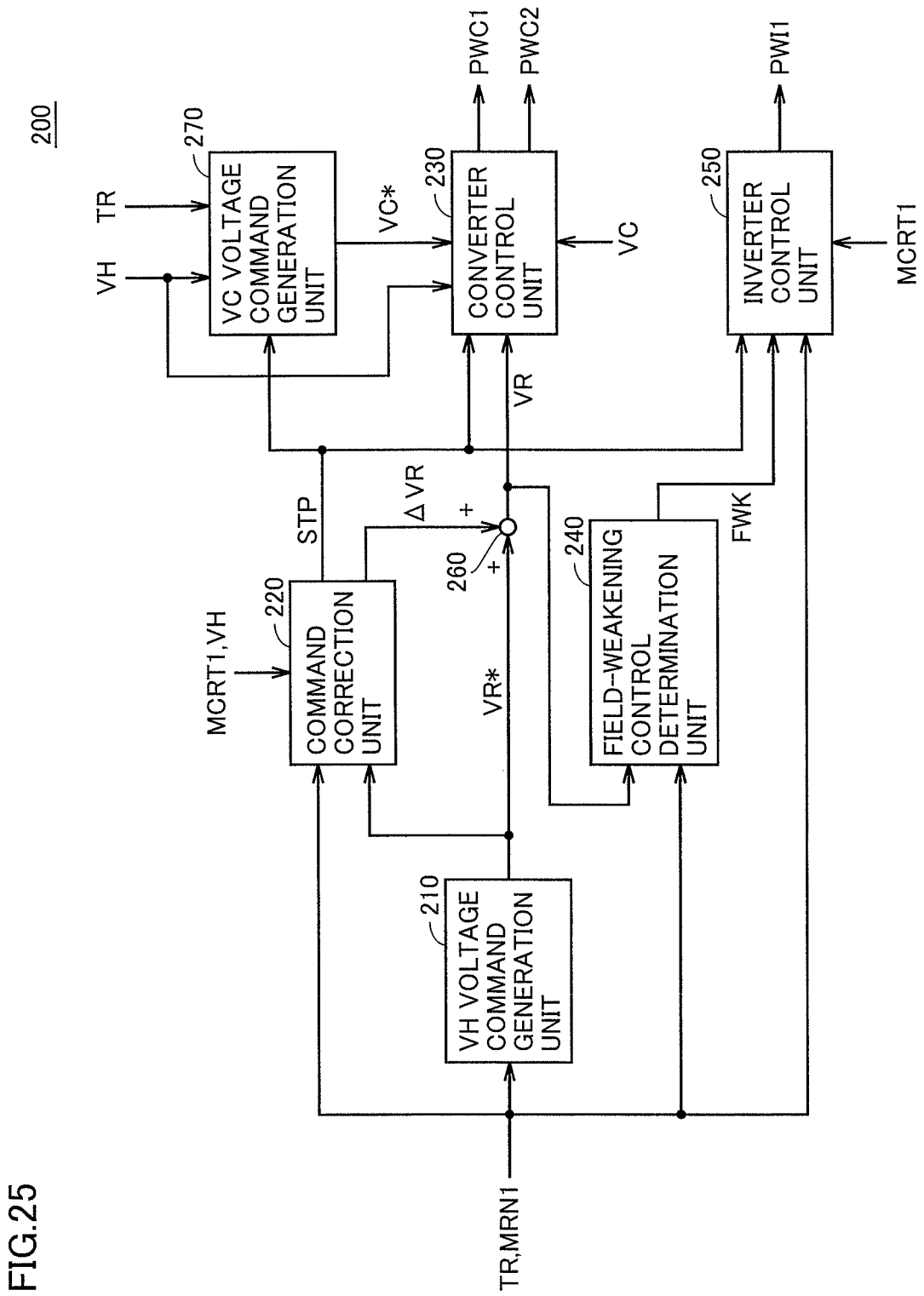
FIG. 25 is a functional block diagram for illustrating motor drive control carried out in a control device in Embodiment 5.

FIG. 25 is a functional block diagram for illustrating motor drive control carried out in control device 200 in FIG. 23 in Embodiment 5. In FIG. 25, a VC voltage command generation unit 270 is added to the functional block diagram in FIG. 11 described in connection with Embodiment 1.

Referring to FIGS. 23 and 25, as in description with reference to FIG. 11, command correction unit 220 operates correction value ΔVR based on torque command value TR, rotation speed MRN1, voltage command value VR*, and motor current MCRT1. In addition, command correction unit 220 generates a stop mode flag STP for stopping a switching operation of converter 120 and inverter 130 when torque command value TR is substantially zero, and outputs the flag to converter control unit 230, inverter control unit 250, and VC voltage command generation unit 270. Specifically, when a switching operation is to be stopped (during the switching stop mode), stop mode flag STP is set to ON and when a switching operation is not to be stopped, stop mode flag STP is set to OFF.

When stop mode flag STP from command correction unit 220 is set to ON, converter control unit 230 and inverter control unit 250 stop a switching operation of a switching element included in each of them.

VC voltage command generation unit 270 receives a detection voltage VH from voltage sensor 140, stop mode flag STP from command correction unit 220, and torque command value TR. When VC voltage command generation unit 270 recognizes cancel of a state that torque command value TR is substantially zero while stop mode flag STP is ON, VC voltage command generation unit 270 generates a step-up voltage command VC* for supply to capacitor C3 and outputs the command to converter control unit 230.

Converter control unit 230 receives voltage command VC* from VC voltage command generation unit 270. Then, converter control unit 230 generates control signal PWC2 such that voltage VC of capacitor C3 attains to voltage command VC* and outputs the signal to converter 125.

It is noted that command correction unit 220 sets stop mode flag STP to OFF and cancels the switching stop mode in response to the fact that an absolute value of difference between system voltage VH and a prescribed maximum value is equal to or lower than a threshold value.

Figure 26:
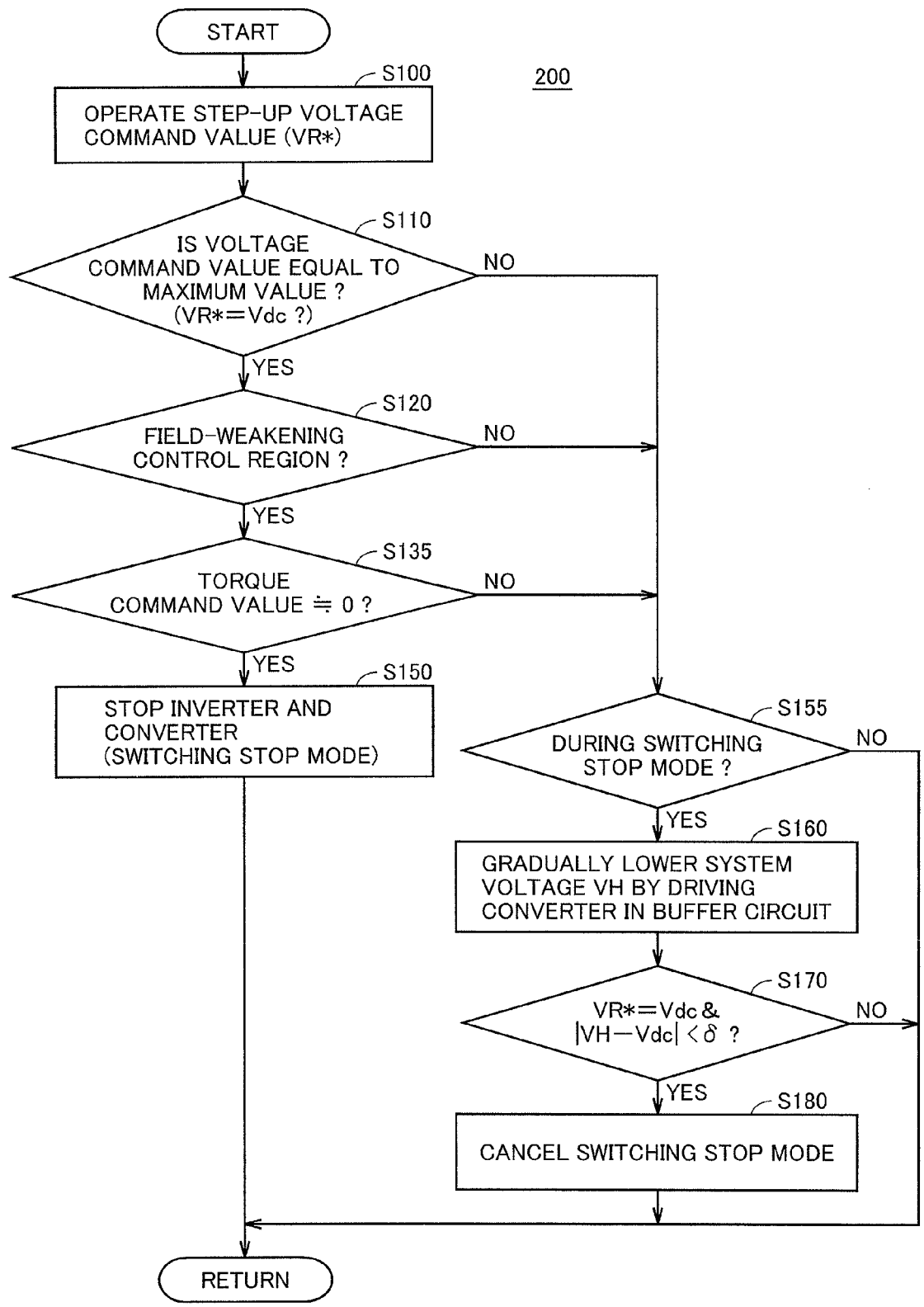
FIG. 26 is a flowchart for illustrating details of motor drive control processing performed in the control device in Embodiment 5.

FIG. 26 is a flowchart for illustrating details of motor drive control processing performed in control device 200 in Embodiment 5. In FIG. 26, steps S155, S160, S170, and S180 are added to the flowchart shown in FIG. 21 in Embodiment 3. Description of the steps in FIG. 26 the same as in FIGS. 12 and 21 will not be repeated.

Referring to FIGS. 23 and 26, when step-up voltage command value VR* for converter 120 is not equal to maximum value Vdc of system voltage VH (NO in S110), when determination as the field-weakening control region has not been made (NO in S120), or when torque command value TR is not substantially zero (NO in S135), control device 200 then allows the process to proceed to S155. Then, control device 200 determines whether or not the switching stop mode has been set, in which a switching operation of converter 120 and inverter 130 is stopped.

When the switching stop mode has not been set (NO in S155), the process returns to the main routine.

On the other hand, when the switching stop mode has been set (YES in S155), the process proceeds to S160, where control device 200 gradually lowers system voltage VH by driving converter 125 in buffer circuit 121.

Then, in S170, control device 200 determines whether or not voltage command value VR* is equal to maximum value Vdc and whether or not an absolute value of difference between system voltage VH and maximum value Vdc is smaller than a threshold value δ.

When voltage command value VR* is equal to maximum value Vdc and when the absolute value of the difference between system voltage VH and maximum value Vdc is smaller than threshold value δ (YES in S170), the process proceeds to S180, where control device 200 cancels the switching stop mode and resumes the switching operation of converter 120 and inverter 130.

When the condition that voltage command value VR* is equal to maximum value Vdc and that the absolute value of the difference between system voltage VH and maximum value Vdc is smaller than threshold value δ is not satisfied (NO in S170), the process returns to the main routine and lowering in system voltage VH by buffer circuit 121 is awaited.

By carrying out control in accordance with the processing as above, in the motor drive system having a buffer circuit as in FIG. 23, a switching operation can quickly be resumed in returning from the switching stop mode in Embodiment 3, without a withstand voltage of a switching element included in a converter being increased.

[Embodiment 6]

In Embodiment 1 to Embodiment 5 described above, a case where one AC motor and one inverter are provided as in FIG. 1 has been described by way of example. In Embodiment 6, one example of a case where control as in Embodiment 1 to Embodiment 5 described above is applied to a hybrid vehicle including an engine and two AC motors and two inverters will be described.

Figure 27:
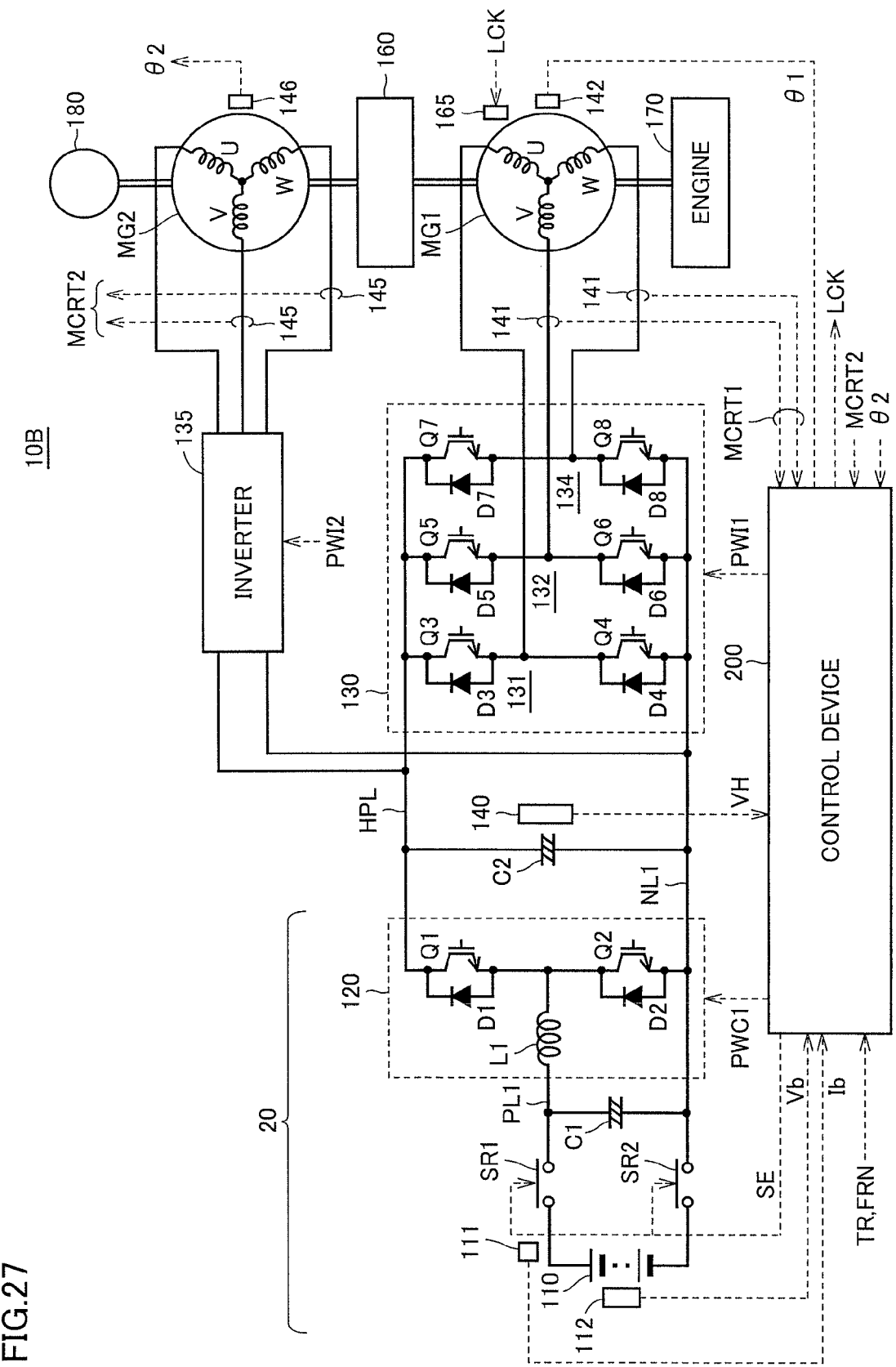
FIG. 27 is an overall configuration diagram of a vehicle incorporating a motor drive system to which a control device for an AC motor according to Embodiment 6 is applied.

FIG. 27 is an overall configuration diagram of a vehicle 10B incorporating a motor drive system to which a control device for an AC motor according to Embodiment 6 is applied.

Referring to FIG. 27, in vehicle 10B, an inverter 135, an AC motor MG2, a current sensor 145, a rotation angle sensor 146, and a locking mechanism 165 are added to the configuration of vehicle 10 shown in FIG. 1. It is noted that the motor drive system in FIG. 27 is constituted of portions with motive power transmission gear 160, engine 170, and drive wheel 180 being excluded. Description of elements in FIG. 27 the same as in FIG. 1 will not be repeated.

Inverter 135 is connected to power line HPL and ground line NL1 in parallel to inverter 130, with respect to converter 120. Though an internal configuration of inverter 135 is not shown, it is the same as in inverter 130, and inverter 135 is configured to include three pairs of switching elements.

Inverter 135 is connected to AC motor MG2 and drives AC motor MG2 in accordance with a control signal PWI2 from control device 200.

AC motor MG2 is connected to AC motor MG1 and engine 170 with motive power transmission gear 160 being interposed. In addition, AC motor MG2 is also connected to drive wheel 180. Then, control device 200 controls AC motors MG1, MG2 and engine 170 in coordination with one another.

It is noted that, in vehicle 10B, AC motor MG2 is used exclusively for generating driving force for running the vehicle. Meanwhile, AC motor MG1 is driven by engine 170 and used exclusively for generating electric power for charging DC power supply 110.

Current sensor 145 detects a motor current MCRT2 that flows in AC motor MG2 and outputs the detected motor current to control device 200. Rotation angle sensor 146 detects an angle of rotation θ2 of AC motor MG2 and outputs detected angle of rotation θ2 to control device 200. Control device 200 can calculate a rotation speed MRN2 and an angular velocity ω2 (rad/s) of AC motor MG2 based on angle of rotation θ2. It is noted that it is not necessary to arrange rotation angle sensor 146 if angle of rotation θ2 is directly operated from a motor voltage or a current in control device 200.

Locking mechanism 165 is an apparatus for mechanically fixing rotation of AC motor MG1. Locking mechanism 165 is constituted, for example, of a clutch, a brake, and the like. Under a defined condition for not allowing rotation of AC motor MG1, locking mechanism 165 is controlled by a control signal LCK from control device 200 to fix rotation of AC motor MG1.

Figure 28:
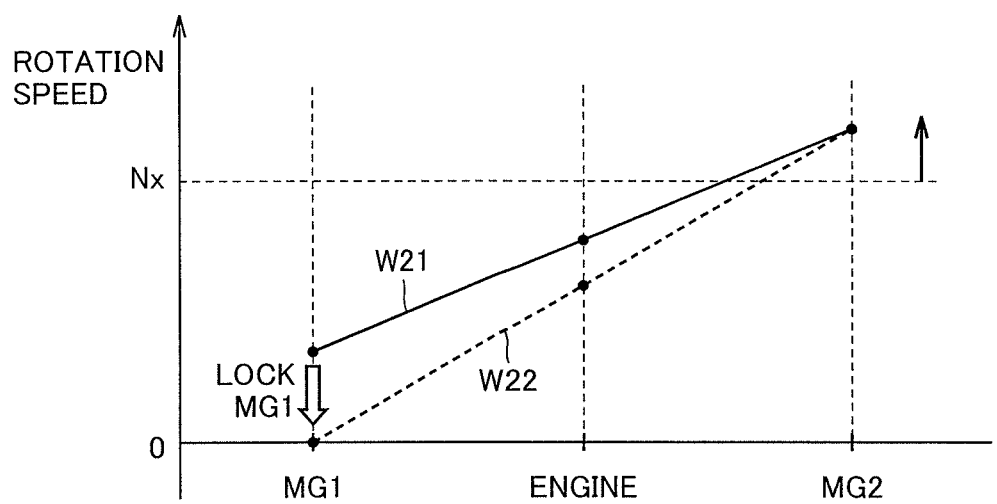
FIG. 28 is a nomographic chart for illustrating outlines of motor drive control in Embodiment 6.

FIG. 28 is a nomographic chart for illustrating outlines of motor drive control in vehicle 10B as shown in FIG. 27.

Referring to FIGS. 27 and 28, it is assumed that a nomographic chart in a case where vehicle 10B is in a certain running state is represented by a solid line W21 in FIG. 28. Then, it is assumed that rotation speed MRN2 of AC motor MG2 is in a high-speed running region higher than a threshold value (Nx in FIG. 28) of a prescribed rotation speed.

Here, for example, there is a case where, during running on a highway or the like, a vehicle runs with AC motor MG1 being driven by engine 170 and with AC motor MG2 being driven directly by generated electric power. In such a case, depending on a running state, running only with driving force generated by engine 170 or running mainly with driving force generated by engine 170 may be more efficient as a whole. In such a case, there may be a case where a method of mechanically fixing AC motor MG1 to thereby reduce power consumption is adopted.

In a case where AC motor MG1 is stopped as such, control device 200 initially lowers rotation speed MRN1 of AC motor MG1 to zero while maintaining rotation speed MRN2 of AC motor MG2 (a dashed line W22 in FIG. 28). Then, control device 200 causes locking mechanism 165 to mechanically fix rotation of AC motor MG1. Then, thereafter, control device 200 carries out control described in Embodiment 1 to Embodiment 5. By doing so, in a case where AC motor MG2 is at a high rotation speed and a low torque command is issued, a maximum value of system voltage VH can be relaxed to thereby improve efficiency.

In particular in a case of running only with driving force generated by engine 170, by stopping a switching operation of both of AC motors MG1, MG2 as in Embodiment 3 described above, power consumption in the AC motors can further be reduced.

In lowering torque of AC motor MG2 without mechanically locking AC motor MG1, it is necessary for inverter 135 to perform a switching operation in order to generate torque such that AC motor MG1 receives reaction force from engine 170. Therefore, there may be a case where a maximum value of system voltage VH cannot be relaxed.

Figure 29:
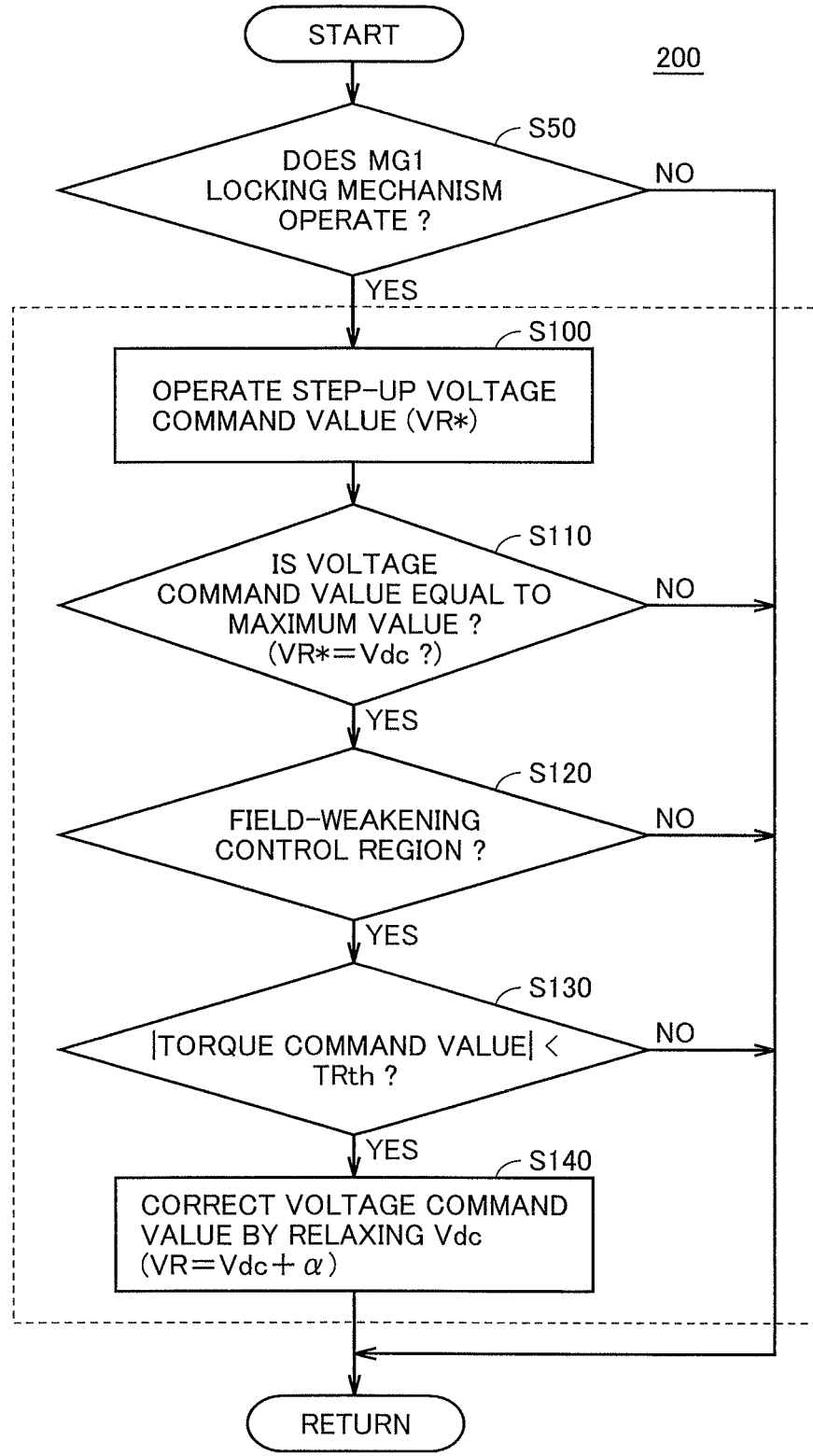
FIG. 29 is a flowchart for illustrating details of motor drive control processing performed in the control device in Embodiment 6.

FIG. 29 is a flowchart for illustrating details of motor drive control processing performed in control device 200 in Embodiment 6. In FIG. 29, step S50 is added to the flowchart shown in FIG. 12 in Embodiment 1. Description of the steps in FIG. 29 the same as in FIG. 12 will not be repeated.

Referring to FIG. 29, in S50, control device 200 determines whether or not locking mechanism 165 operates to fix rotation of AC motor MG 1.

When locking mechanism 165 operates (YES in S50), the process proceeds to S100. Then, control device 200 performs subsequent processing for AC motor MG2, and when a condition is satisfied, control device 200 increases a step-up command value for converter 120 by relaxing maximum value Vdc of system voltage VH.

When locking mechanism 165 does not operate (NO in S50), the process returns to the main routine.

Though a case where Embodiment 1 is applied to a case where AC motor MG 1 is mechanically locked has been described with reference to FIG. 29, the steps in a portion shown with a dashed line in FIG. 29 may be those in any of Embodiment 2 to Embodiment 5 or combination thereof.

[Embodiment 7]

In a case where Embodiment 3 is applied to vehicle 10 in FIG. 1, when the switching stop mode in which a switching operation of inverter 130 is stopped is set, regenerative braking force is not generated by AC motor MG1. Then, deceleration force corresponding to engine brake generated in a vehicle with only an engine serving as a drive source is not generated and hence a driver may have a feeling of idle running.

Meanwhile, there is a concept of "free running" in which running is achieved by coasting without transmitting driving force and deceleration force to drive wheels by setting an accelerator pedal to OFF, releasing a clutch, or setting a reduction gear to a neutral position. In this free running, for example, during running on a flat or gradually sloping-down highway or the like, running can be continued while driving force generated from the engine is reduced and energy loss due to unnecessary deceleration force is suppressed, and hence fuel efficiency can be improved in some cases.

Therefore, application of the switching stop mode shown in Embodiment 3 is well adapted to such a situation that such free running is intended.

In Embodiment 7, a configuration in which the switching stop mode is executed while free running is indicated will be described.

Figure 30:
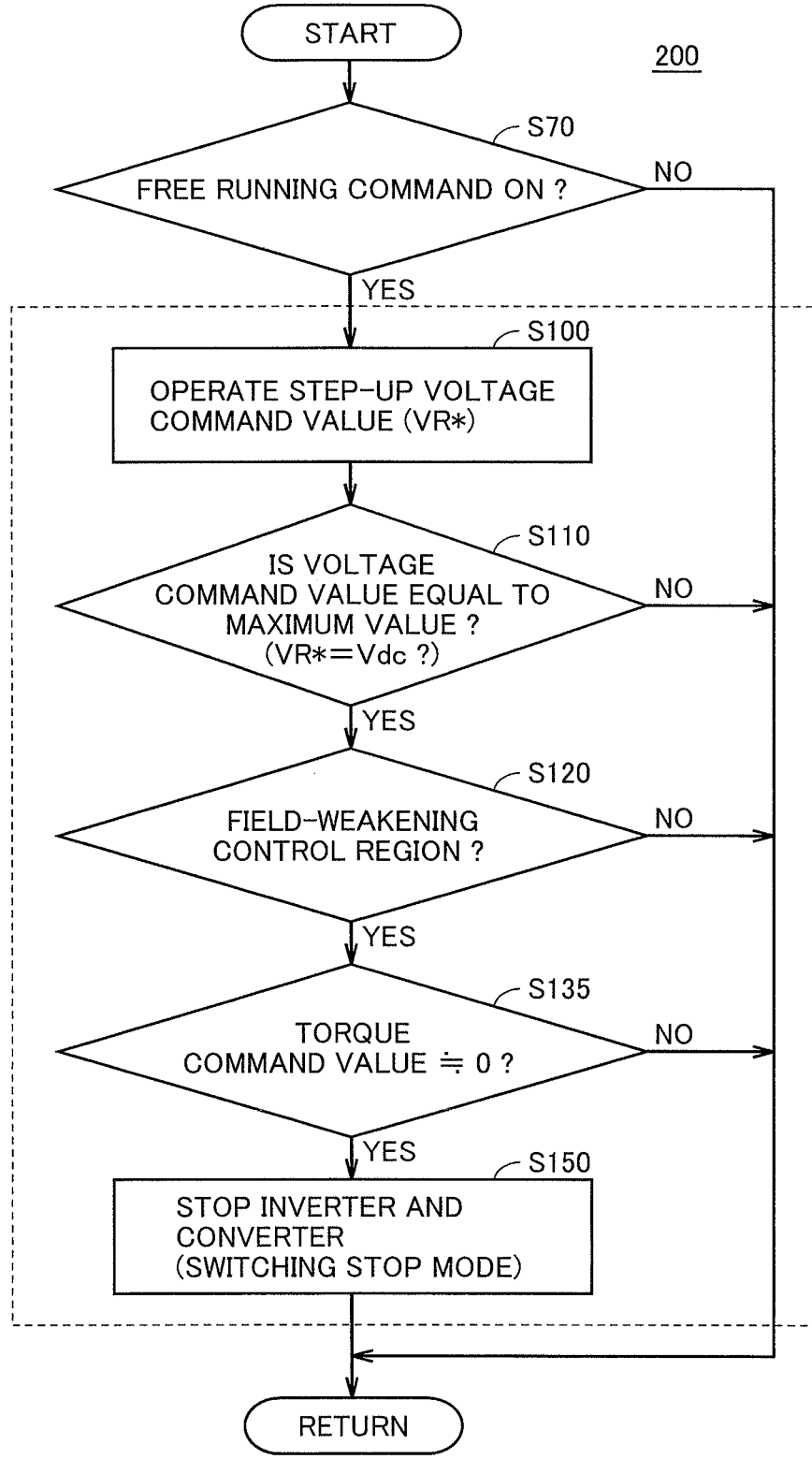
FIG. 30 is a flowchart for illustrating details of motor drive control processing performed in a control device in Embodiment 7.

FIG. 30 is a flowchart for illustrating details of motor drive control processing performed in control device 200 in Embodiment 7. In FIG. 30, step S70 is added to the flowchart shown in FIG. 21 in Embodiment 3. Description of the steps in FIG. 30 the same as in FIGS. 12 and 21 will not be repeated.

Referring to FIG. 30, in S70, control device 200 determines whether or not a free running command FRN is ON. Free running command FRN is recognized by control device 200, for example, in response to a driver's operation of a "free running mode switch" provided in a console or a steering wheel portion in a car.

When free running command FRN is ON (YES in S70), the process proceeds to S100. Then, when a condition is satisfied in processing in subsequent steps S110, S120, and S135, control device 200 stops in S150 the switching operation of converter 120 and inverter 130.

On the other hand, when free running command FRN is OFF (NO in S70), the process returns to the main routine.

(Variation)

With regard to free running described above, the switching stop mode may be applied when the free running mode is set in a case where a condition for relaxing a maximum value of system voltage VH is satisfied in Embodiment 1.

Figure 31:
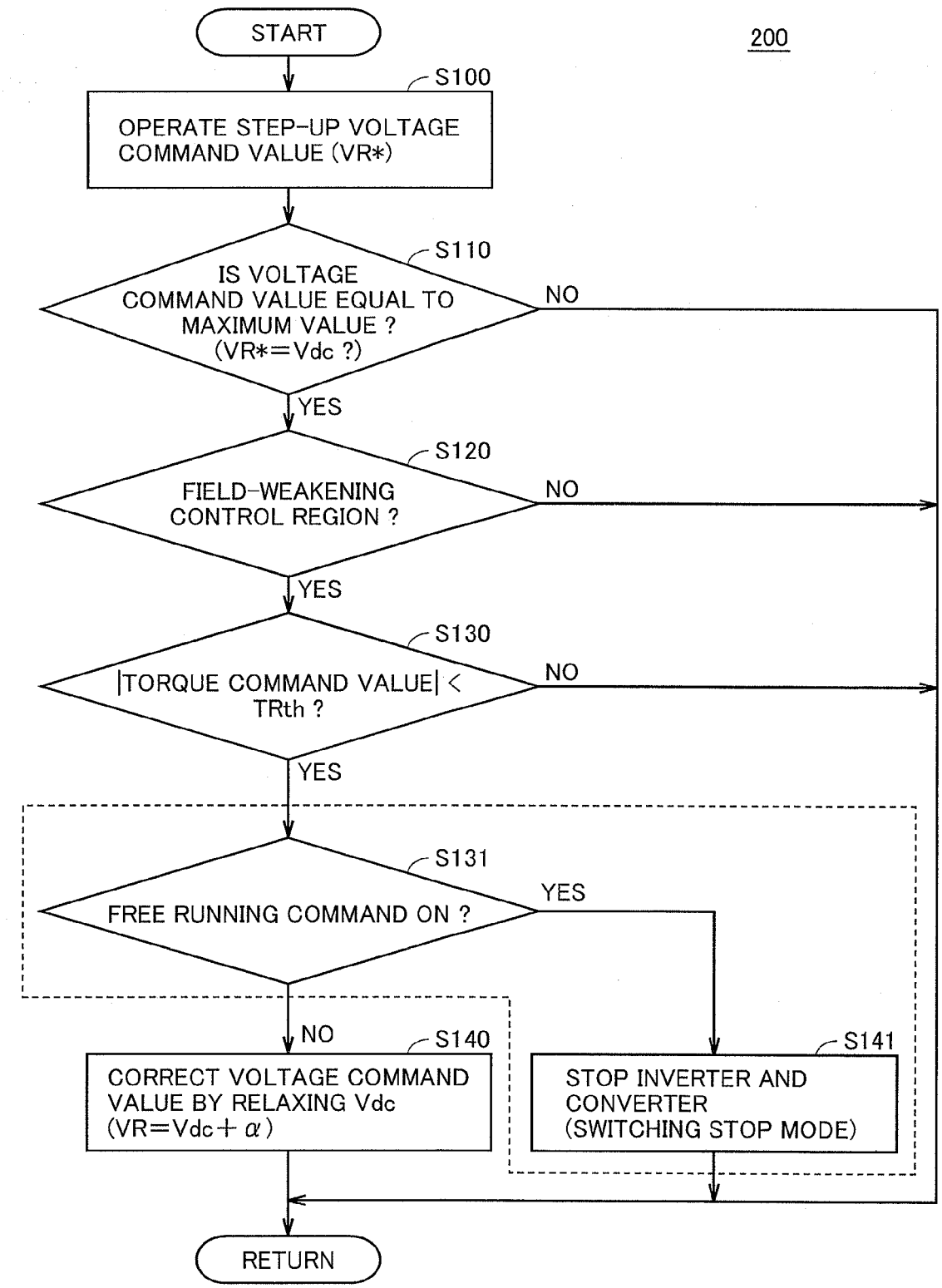
FIG. 31 is a flowchart for illustrating details of motor drive control processing performed in the control device in a variation of Embodiment 7.

FIG. 31 is a flowchart for illustrating details of motor drive control processing performed in control device 200 in a variation of Embodiment 7. In FIG. 31, steps S131 and S141 are added to the flowchart shown in FIG. 12 of Embodiment 1. Description of the steps in FIG. 31 the same as in FIG. 12 will not be repeated.

Referring to FIG. 31, in S130, when the absolute value of torque command value TR for AC motor MG1 is determined to be smaller than threshold value TRth (YES in S130), the process then proceeds to S131.

In S131, control device 200 determines whether or not free running command FRN is ON.

When free running command FRN is OFF (NO in S131), in S140, control device 200 corrects a voltage command value for converter 120 by relaxing maximum value Vdc of system voltage VH.

On the other hand, when free running command FRN is ON (YES in S131), control device 200 stops in S141 the switching operation of converter 120 and inverter 130.

By carrying out control in accordance with such processing, when the free running mode is not set in a case where a prescribed condition is satisfied, start of field-weakening control is shifted toward a high-speed side by relaxing a maximum value of system voltage VH, and when the free running mode is set, the switching stop mode can be set. Thus, efficiency of the motor drive system can be improved.

It is noted that the variation described above is also similarly applicable to Embodiment 2.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

Reference Signs List 10, 10A, 10B vehicle; 20 DC voltage generation portion; 100, 100A motor drive system; 110 DC power supply; 111, 141, 145 current sensor; 112, 140, 143 voltage sensor; 120, 125 converter; 121 buffer circuit; 130, 135 inverter; 131 U-phase upper and lower arm; 132 V-phase upper and lower arm; 134 W-phase upper and lower arm; 142, 146 rotation angle sensor; 160 motive power transmission gear; 165 locking mechanism; 170 engine; 180 drive wheel; 200 control device; 210 VH voltage command generation unit; 220 command correction unit; 230 converter control unit; 240 field-weakening control determination unit; 250 inverter control unit; 260 addition unit; 270 VC voltage command generation unit; C1 to C3 capacitor; D1 to D8, D11, D12 diode; HPL, PH power line; L1, L2 reactor; MG1, MG2 AC motor; NL1 ground line; Q1 to Q8, Q11, Q12 switching element; and SR1, SR2 system relay.

The invention claimed is:

1. A control device for a motor drive system for driving an AC motor having a magnet in a rotor, said motor drive system including a DC power supply configured to be chargeable, a first converter for stepping up a power supply voltage supplied from said DC power supply and an inverter for driving said AC motor by converting DC power from said first converter to AC power, said control device
generating a step-up command value for said first converter based on a torque command value for said AC motor,
determining whether to carry out field-weakening control for increasing a current in a direction weakening force of said magnet that is supplied from said inverter to said AC motor based on said step-up command value and a state of drive of said AC motor, and
further increasing generated said step-up command value when said field-weakening control should be carried out and when an absolute value of said torque command value is smaller than a threshold value.

2. The control device for a motor drive system according to claim 1, wherein
when said field-weakening control should be carried out and when the absolute value of said torque command value is smaller than said threshold value, said generated step-up command value is further increased based on a first voltage fluctuation component restricting said step-up command value, in consideration of output voltage fluctuation in said first converter caused by control.

3. The control device for a motor drive system according to claim 1, wherein
when said field-weakening control should be carried out and when the absolute value of said torque command value is smaller than said threshold value, said generated step-up command value is further increased based on a second voltage fluctuation component restricting said step-up command value, in consideration of a smaller one of voltage fluctuation at a switching operation of a switching element included in said first converter and voltage fluctuation at a switching operation of a switching element included in said inverter.

4. The control device for a motor drive system according to claim 3, wherein
said second voltage fluctuation component is determined, with regard to said first converter, in accordance with a current that flows in said first converter and is determined, with regard to said inverter, in accordance with a current that flows in said AC motor.

5. The control device for a motor drive system according to claim 4, wherein
the current that flows in said first converter is calculated based on the current that flows in said AC motor.

6. The control device for a motor drive system according to claim 1, wherein
when said field-weakening control should be carried out and when said torque command value is substantially zero, a switching operation of said first converter and said inverter is stopped and said generated step-up command value is further increased up to a withstand voltage of a switching element included in said first converter and said inverter.

7. The control device for a motor drive system according to claim 6, wherein
the withstand voltage of the switching element included in said first converter is higher than the withstand voltage of the switching element included in said inverter.

8. The control device for a motor drive system according to claim 6, wherein
said motor drive system further includes
a capacitor for absorbing electric power generated at a power supply node between said first converter and said inverter, and
a second converter connected between said power supply node and said capacitor, and
said control device restricts said step-up command value to a voltage obtained by subtracting a voltage corresponding to at least one of said first voltage fluctuation component and said second voltage fluctuation component from the withstand voltage of the switching element included in said first converter, and controls said second converter such that a voltage at said power supply node is lower than restricted said step-up command value, when a state that said inverter and said first converter have been stopped is to be canceled.

9. A vehicle, comprising:
an AC motor having a magnet in a rotor;
a DC power supply configured to be chargeable;
a drive device for driving said AC motor with electric power from said DC power supply; and
a control device for controlling said drive device,
said drive device including
an inverter for driving said AC motor, and
a converter connected between said DC power supply and said inverter and configured to convert a voltage between said DC power supply and said inverter, and
said control device
generating a step-up command value for said converter based on a torque command value for said AC motor,
determining whether to carry out field-weakening control for increasing a current in a direction weakening force of said magnet that is supplied from said inverter to said AC motor based on said step-up command value and a state of drive of said AC motor, and
further increasing generated said step-up command value when said field-weakening control should be carried out and when an absolute value of said torque command value is smaller than a threshold value.

10. The vehicle according to claim 9, wherein
said AC motor includes
a first AC motor mainly for generating electric power for charging said DC power supply, and
a second AC motor mainly for generating driving force for running said Vehicle,
said inverter includes
a first inverter for driving said first AC motor, and
a second inverter connected to said converter in parallel to said first inverter, for driving said second AC motor,
said vehicle further comprises
an engine connected to said first AC motor and said second AC motor and configured to generate driving force for said vehicle under control by said control device in coordination with said first AC motor and said second AC motor , and
a locking mechanism configured to be able to mechanically fix rotation of said first AC motor when a predetermined condition is satisfied, and
said control device further increases generated said step-up command value based on a state of drive of said second AC motor when said locking mechanism fixes rotation of said first AC motor.

11. The vehicle according to claim 10, wherein
when said locking mechanism fixes rotation of said first AC motor, said control device drives said vehicle with driving force generated by said engine and stops a switching operation of said first inverter, said second inverter, and said converter.

12. The vehicle according to claim 9, wherein
said control device has a free running mode in which driving force provided to said vehicle is set substantially to zero, and when said free running mode is set, said control device stops a switching operation of said inverter and said converter.

* * * * *